US012279079B2

(12) United States Patent
Wang et al.

(10) Patent No.: US 12,279,079 B2
(45) Date of Patent: Apr. 15, 2025

(54) PROJECTION DISPLAY METHOD AND ELECTRONIC DEVICE

(71) Applicant: Huawei Technologies Co., Ltd., Shenzhen (CN)

(72) Inventors: Bihai Wang, Shenzhen (CN); Pengcheng Nie, Shenzhen (CN); Licheng Song, Hangzhou (CN); Xiaolei Liu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 17/625,048

(22) PCT Filed: Jul. 3, 2020

(86) PCT No.: PCT/CN2020/100038
§ 371 (c)(1),
(2) Date: Jan. 5, 2022

(87) PCT Pub. No.: WO2021/004381
PCT Pub. Date: Jan. 14, 2021

(65) Prior Publication Data
US 2022/0295027 A1    Sep. 15, 2022

(30) Foreign Application Priority Data
Jul. 5, 2019    (CN) .......................... 201910606519.7

(51) Int. Cl.
*H04N 9/31*    (2006.01)
*G06F 3/14*    (2006.01)
(Continued)

(52) U.S. Cl.
CPC ............. *H04N 9/3188* (2013.01); *G06F 3/14* (2013.01); *G09G 3/001* (2013.01); *G09G 5/14* (2013.01);
(Continued)

(58) Field of Classification Search
CPC ............. H04N 9/3188; H04N 21/2662; H04N 21/4408; H04N 21/41407;
(Continued)

(56) References Cited

U.S. PATENT DOCUMENTS 10,212,471 B2 *    2/2019    Gao ...................... G06F 3/1431
2002/0186212 A1 *    12/2002    Matsumoto ........ H04N 21/4316
345/204
(Continued)

FOREIGN PATENT DOCUMENTS

CN    101587431 A    11/2009
CN    103856809 A    6/2014
(Continued)

OTHER PUBLICATIONS

"Series H: Audiovisual and Multimedia Systems, Infrastructure of audiovisual services—Coding of moving video, Video coding for low bit rate communication," ITU-T Recommendation H.263, ITU-T Telecommunication Standardization Sector of ITU, Total 226 pages, International Telecommunication Union, Geneva, Switzerland (Jan. 2005).
(Continued)

*Primary Examiner* — John W Miller
*Assistant Examiner* — Sean N. Haiem
(74) *Attorney, Agent, or Firm* — Leydig, Voit & Mayer, Ltd.

(57) ABSTRACT

Embodiments of this application provide a projection display method and an electronic device, and relate to the field of terminal technologies, to dynamically adjust, based on a quantity of source devices, a parameter of display data projected onto a destination device, so as to improve display smoothness and use experience of a user during projection. The method includes: A source device sends a projection instruction to a destination device, where the projection
(Continued)

instruction is used to instruct to project a display interface of the source device onto the destination device for display. The source device receives a first broadcast sent by the destination device, where the first broadcast includes a quantity N of source devices that need to perform projection onto the destination device for display. The source device negotiates a first projection parameter with the destination device based on the quantity N of the source devices, where the first projection parameter includes one or more of a projection resolution, a transmission bit rate, or an encoding compression rate. The source device sends first display data to the destination device based on the first projection parameter.

20 Claims, 15 Drawing Sheets

(51) Int. Cl.
G09G 3/00 (2006.01)
G09G 5/14 (2006.01)
H04N 21/2662 (2011.01)
H04N 21/41 (2011.01)
H04N 21/414 (2011.01)
H04N 21/431 (2011.01)
H04N 21/436 (2011.01)
H04N 21/4402 (2011.01)
H04N 21/4408 (2011.01)

(52) U.S. Cl.
CPC ..... *H04N 21/2662* (2013.01); *H04N 21/4122* (2013.01); *H04N 21/41407* (2013.01); *H04N 21/4312* (2013.01); *H04N 21/436* (2013.01); *H04N 21/440263* (2013.01); *H04N 21/440281* (2013.01); *H04N 21/4408* (2013.01)

(58) Field of Classification Search
CPC ....... H04N 21/440281; H04N 21/4312; H04N 21/4122; H04N 21/440263; H04N 21/436; G09G 5/14; G09G 3/001; G09G 3/14; G09G 2370/04; G09G 2370/20
See application file for complete search history.

(56) References Cited

U.S. PATENT DOCUMENTS

| | | | | |
|---|---|---|---|---|
| 2004/0130568 | A1* | 7/2004 | Nagano | H04N 21/4312 348/E7.083 |
| 2005/0052578 | A1* | 3/2005 | Phillips | H04N 21/435 348/E7.078 |
| 2007/0035470 | A1* | 2/2007 | Lee | H04N 21/47 345/1.1 |
| 2007/0102764 | A1* | 5/2007 | Ando | H04N 21/4325 348/E5.006 |
| 2010/0302130 | A1* | 12/2010 | Kikuchi | H04N 21/4316 345/1.3 |
| 2012/0026189 | A1 | 2/2012 | Yokoyama et al. | |
| 2012/0284650 | A1* | 11/2012 | Chang | H04N 21/41265 715/756 |
| 2013/0079063 | A1* | 3/2013 | Jouin | H04N 21/47 455/566 |
| 2014/0115528 | A1* | 4/2014 | Nagano | G06F 3/0481 715/781 |
| 2014/0223334 | A1* | 8/2014 | Jensen | H04L 65/403 715/753 |
| 2015/0086174 | A1* | 3/2015 | Abecassis | H04N 21/8358 386/201 |
| 2015/0160913 | A1* | 6/2015 | Lee | G09G 5/14 345/2.2 |
| 2015/0178032 | A1 | 6/2015 | Gantman et al. | |
| 2016/0080549 | A1* | 3/2016 | Yuan | H04N 21/43615 455/420 |
| 2017/0237931 | A1* | 8/2017 | Lee | H04N 21/4122 348/565 |

FOREIGN PATENT DOCUMENTS

| | | |
|---|---|---|
| CN | 104703022 A | 6/2015 |
| CN | 105955689 A | 9/2016 |
| CN | 106528025 A | 3/2017 |
| CN | 106856563 A | 6/2017 |
| CN | 107291412 A | 10/2017 |
| CN | 108134957 A | 6/2018 |
| CN | 108694029 A | 10/2018 |
| CN | 109508162 A | 3/2019 |
| CN | 110381345 A | 10/2019 |
| EP | 1385336 A2 | 1/2004 |

OTHER PUBLICATIONS

"Series H: Audiovisual and Multimedia Systems, Infrastructure of audiovisual services—Coding of moving video, Advanced video coding for generic audiovisual services," Recommendation ITU-T H.264, ITU-T Telecommunication Standardization Sector of ITU, Total 812 pages, International Telecommunication Union, Geneva, Switzerland (Apr. 2017).

"Series H: Audiovisual and Multimedia Systems, Infrastructure of audiovisual services—Coding of moving video, High efficiency video coding," Recommendation ITU-T H.265, ITU-T Telecommunication Standardization Sector of ITU, Total 692 pages, International Telecommunication Union, Geneva, Switzerland (Feb. 2018).

* cited by examiner

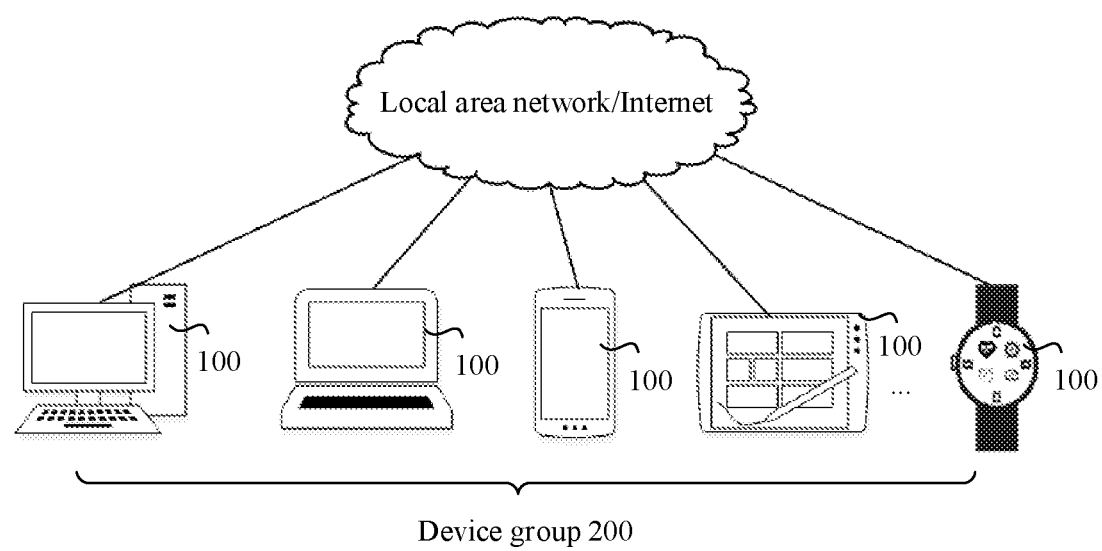
FIG. 1
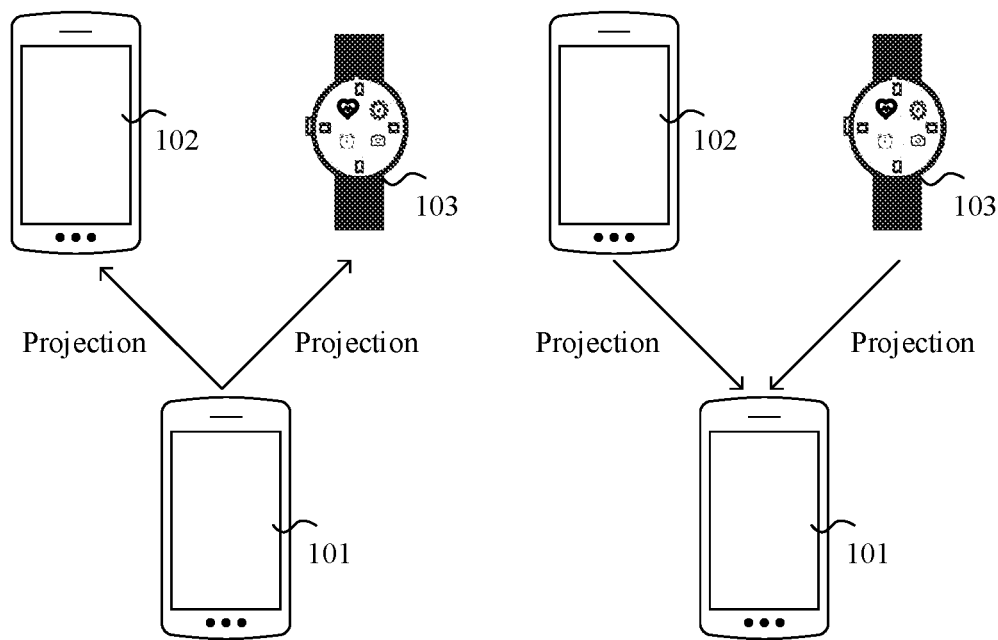
FIG. 2A
FIG. 2B

PROJECTION DISPLAY METHOD AND ELECTRONIC DEVICE

CROSS-REFERENCE TO RELATED APPLICATIONS

The present application is a National Stage of International Patent Application No. PCT/CN2020/100038, filed on Jul. 3, 2020, which claims priority to Chinese Patent Application No. 201910606519.7, filed on Jul. 5, 2019. The disclosures of the aforementioned applications are hereby incorporated by reference in their entireties.

TECHNICAL FIELD

This application relates to the field of terminal technologies, and in particular, to a projection display method and an electronic device.

BACKGROUND

Currently, a projection function has been widely used in daily life of a user. For example, the user may install a projection application on a mobile phone, and project a display interface on the mobile phone (namely, a source device) onto a destination device (for example, a smart TV) that supports a projection function for display, so that the user can conveniently view, on different devices, display content on a same device.

In some scenarios, users may project display content on a plurality of source devices onto a same destination device for display. For example, a user A may project a game interface 1 displayed on a mobile phone 1 onto a smart TV for display, and a user B may project a game interface 2 displayed on a mobile phone 2 onto the smart TV for display.

When there are a relatively large quantity of source devices, the source devices simultaneously send display data that needs to be projected onto the destination device. In this case, an available transmission bandwidth of each source device decreases, resulting in a reduced transmission speed and prolonged transmission time. As a result, problems such as frame freezing and a delay may occur during display by the destination device. In addition, when simultaneously receiving the display data sent by the source devices, the destination device needs to decode the display data sent by each source device. When a computing capability of the destination device is insufficient, the destination device cannot decode the display data in a timely manner, and problems such as frame freezing and a delay occur during display by the destination device.

SUMMARY

This application provides a projection display method and an electronic device, to dynamically adjust, based on a quantity of source devices, a parameter of display data projected onto a destination device, so as to improve display smoothness and a user experience of a user during projection.

To achieve the foregoing objective, this application discloses the following technical solutions.

According to a first aspect, this application provides a projection display method, including: sending, by a source device, a projection instruction to a destination device, where the projection instruction is used to instruct to project a display interface of the source device onto the destination device for display. Further, the source device may receive a first broadcast sent by the destination device, where the first broadcast includes a quantity N (where N is an integer greater than 0) of source devices that need to perform projection onto the destination device for display. The source device may negotiate, based on the quantity N of the source devices, a first projection parameter used during projection with the destination device, where the first projection parameter may include one or more of a projection resolution, a transmission bit rate, or an encoding compression rate. In this way, the source device may send first display data to the destination device based on the first projection parameter.

In other words, during projection, the source device and the destination device may dynamically negotiate, based on the current quantity N of source devices, a projection parameter used during projection onto the destination device. In this way, when there are a relatively large quantity of source devices, display smoothness during projection can be preferentially ensured by adjusting a projection parameter. When there are a relatively small quantity of source devices, display definition during projection can be preferentially ensured by adjusting a projection parameter, so that a user can obtain a better user experience in different projection scenarios.

The first projection parameters negotiated by the source devices and the destination device may be the same or different.

In a possible implementation, the source device may store a correspondence between different quantities of source devices and different projection parameters. In this case, that the source device negotiates a first projection parameter with the destination device based on the quantity N of source devices includes: determining, by the source device based on the correspondence, the first projection parameter corresponding to the quantity N of source devices; and sending, by the source device, the determined first projection parameter to the destination device for storage.

Alternatively, the source device may automatically calculate, based on the current quantity N of source devices, the first projection parameter used during projection. For example, when the quantity N of source devices is 1, the source device may set the transmission bit rate in the first projection parameter to a bit rate (for example, 10 M) of a current total bandwidth. When the quantity N of source devices is 2, the source device may set the transmission bit rate in the first projection parameter to half of the bit rate of the current total bandwidth, that is, 5 M.

In a possible implementation, before the source device negotiates the first projection parameter with the destination device based on the quantity N of source devices, the method further includes: receiving, by the source device, a codec protocol type supported by the destination device sent by the destination device; and determining, by the source device based on the codec protocol type supported by the destination device, a codec protocol type used during projection.

In a possible implementation, after the source device sends the first display data to the destination device based on the first projection parameter, the method further includes: receiving, by the source device, a second broadcast sent by the destination device, where the second broadcast includes a quantity M (where M is a positive integer not equal to N) of source devices that need to perform projection onto the destination device for display. Further, the source device may negotiate a second projection parameter with the destination device based on the current quantity M of source devices, where the second projection parameter is different from the first projection parameter. The source device sends second display data to the destination device based on the second projection parameter.

In other words, when the quantity of source devices changes during projection, the source device may renegotiate the second projection parameter with the destination device, and perform projection display based on the second projection parameter.

According to a second aspect, this application provides a projection display method, including: sending, by a source device, a projection instruction to a destination device, where the projection instruction is used to instruct to project a display interface of the source device onto the destination device for display. Further, the source device may receive a first broadcast sent by the destination device, where the first broadcast includes a reference threshold of a first projection parameter used when a quantity of source devices is N, the first projection parameter may include one or more of a projection resolution, a transmission bit rate, or an encoding compression rate, and the reference threshold is used to indicate a maximum value of the first projection parameter supported by the destination device. The source device determines the first projection parameter based on the reference threshold of the first projection parameter. The source device sends first display data to the destination device based on the first projection parameter.

In other words, when the source device and the destination device may negotiate a projection parameter, the destination device may determine, based on the quantity N of source devices, a maximum value of the projection parameter (namely, a reference threshold) supported by the destination device. Further, each source device may determine an appropriate projection parameter within the reference threshold based on a projection capability of the source device, and perform projection onto the destination device based on the determined projection parameter.

In a possible implementation, that the source device determines the first projection parameter based on the reference threshold of the first projection parameter includes: determining, by the source device if the source device supports the reference threshold of the first projection parameter, the reference threshold of the first projection parameter as the first projection parameter; or determining, if the source device does not support the reference threshold of the first projection parameter, the maximum value of the projection parameter supported by the source device as the first projection parameter.

In a possible implementation, after the source device sends the first display data to the destination device based on the first projection parameter, the method further includes: receiving, by the source device, a second broadcast sent by the destination device, where the second broadcast includes a reference threshold of a second projection parameter used when the quantity of source devices is M, and M is a positive integer not equal to N. The source device determines the second projection parameter based on the reference threshold of the second projection parameter, where the second projection parameter is different from the first projection parameter. The source device sends second display data to the destination device based on the second projection parameter.

In other words, when the quantity of source devices changes during projection, the source device may renegotiate a projection parameter with the destination device, and perform projection display based on the renegotiated projection parameter.

According to a third aspect, this application provides a projection display method, including: determining, by a destination device, that a quantity of source devices that need to perform projection onto the destination device for display is N (where N is an integer greater than 0). The destination device negotiates, based on the quantity N of source devices, a first projection parameter used during projection with each of N source devices, where the first projection parameter may include one or more of a projection resolution, a transmission bit rate, or an encoding compression rate. The destination device receives display data sent by each of the N source devices based on the first projection parameter, and simultaneously displays the display data sent by the N source devices in a projection interface.

When the quantity of source devices changes, the destination device may negotiate a projection parameter used during this projection with the source device. When there are a relatively large quantity of source devices, display smoothness during projection can be preferentially ensured by adjusting a projection parameter. When there are a relatively small quantity of source devices, display definition during projection can be preferentially ensured by adjusting a projection parameter, so that a user can obtain a better user experience in different projection scenarios.

In a possible implementation, that the destination device negotiates, based on the quantity N of source devices, a first projection parameter used during projection with each of N source devices includes: sending, by the destination device, a first broadcast to each of the N source devices, where the first broadcast includes the quantity N of source devices, so that each source device determines a corresponding first projection parameter based on the quantity N of source devices; and receiving and storing, by the destination device, the first projection parameter sent by each of the N source devices.

In a possible implementation, that the destination device negotiates, based on the quantity N of source devices, a first projection parameter used during projection with each of N source devices includes: determining, by the destination device based on the quantity N of source devices, a reference threshold of the first projection parameter used by each source device during projection, where the reference threshold is used to indicate a maximum first projection parameter supported by the destination device; sending, by the destination device, a first broadcast to each of the N source devices, where the first broadcast includes the reference threshold of the first projection parameter; and receiving and storing, by the destination device, the first projection parameter sent by each of the N source devices.

In a possible implementation, after the destination device simultaneously displays the display data sent by the N source devices in the projection interface, the method further includes: determining, by the destination device, that the quantity of source devices that need to perform projection onto the destination device for display is M, where M is a positive integer not equal to N; negotiating, by the destination device based on the quantity M of source devices, a second projection parameter used during projection with each of the M source devices, where the second projection parameter is different from the first projection parameter; and receiving, by the destination device, display data sent by each of the M source devices based on the second projection parameter, and simultaneously displaying the display data sent by the M source devices in the projection interface. In other words, when the quantity of source devices changes, the destination device may renegotiate a projection parameter used during this projection with each source device.

In a possible implementation, that a destination device determines that a quantity of source devices that need to perform projection onto the destination device for display is N includes: determining, by the destination device, the quantity N of source devices based on a quantity of projection instructions sent by the source devices; or determining, by the destination device, the quantity N of source devices based on a quantity of established communications connections.

For example, the first projection parameter may include a first projection resolution, and the second projection parameter includes a second projection resolution. If M is greater than N, the first projection resolution is greater than the second projection resolution. If M is less than N, the first projection resolution is less than the second projection resolution.

In other words, when there are a relatively large quantity of projection source devices, a projection resolution may be decreased, to improve display smoothness of the destination device during projection. Correspondingly, when there are a relatively small quantity of projection source devices, a projection resolution may be increased, to improve display definition of the destination device during projection.

For example, the first projection parameter includes a first encoding compression rate, and the second projection parameter includes a second encoding compression rate. If M is greater than N, the first encoding compression rate is less than the second encoding compression rate. If M is less than N, the first encoding compression rate is greater than the second encoding compression rate.

In other words, when there are a relatively large quantity of projection source devices, an encoding compression rate may be increased, to improve display smoothness of the destination device during projection. Correspondingly, when there are a relatively small quantity of projection source devices, an encoding compression rate may be decreased, to improve display definition of the destination device during projection.

For example, the first projection parameter includes a first transmission bit rate, and the second projection parameter includes a second transmission bit rate. If M is greater than N, the first transmission bit rate is greater than the second transmission bit rate. If M is less than N, the first transmission bit rate is less than the second transmission bit rate.

In other words, when there are a relatively large quantity of projection source devices, a transmission bit rate may be decreased, to improve display smoothness of the destination device during projection. Correspondingly, when there are a relatively small quantity of projection source devices, a transmission bit rate may be increased, to improve display definition of the destination device during projection.

According to a fourth aspect, this application provides an electronic device. The electronic device is a source device during projection, and the source device includes a display, one or more processors, one or more memories, and one or more computer programs. The processor is coupled to both the display and the memory, and the one or more computer programs are stored in the memory. When the source device runs, the processor executes the one or more computer programs stored in the memory, so that the source device performs the projection display method according to any one of the first aspect, the second aspect, and the possible implementations of the first aspect and the second aspect.

According to a fifth aspect, this application provides an electronic device. The electronic device is a destination device during projection, and the destination device includes a display, one or more processors, one or more memories, and one or more computer programs. The processor is coupled to both the display and the memory, and the one or more computer programs are stored in the memory. When the destination device runs, the processor executes the one or more computer programs stored in the memory, so that the destination device performs the projection display method according to any one of the third aspect and the possible implementations of the third aspect.

According to a sixth aspect, this application provides a computer storage medium, including computer instructions. When the computer instructions are run on an electronic device, the electronic device is enabled to perform the projection display method according to any one of the first aspect to the third aspect and the possible implementations of the first aspect to the third aspect.

According to a seventh aspect, this application provides a computer program product. When the computer program product is run on an electronic device, the electronic device is enabled to perform the projection display method according to any one of the first aspect to the third aspect and the possible implementations of the first aspect to the third aspect.

It may be understood that, the electronic devices in the fourth aspect and the fifth aspect, the computer storage medium in the sixth aspect, and the computer program product in the seventh aspect that are provided above are all configured to perform the corresponding methods provided above. Therefore, for beneficial effects that can be achieved by the terminals, the computer storage medium, and the computer program product, refer to beneficial effects in the corresponding methods provided above. Details are not described again herein.

BRIEF DESCRIPTION OF DRAWINGS

FIG. 1 is a scenario architectural diagram of a projection display system according to an embodiment of this application;

FIG. 2A and FIG. 2B are scenario architectural diagrams of a projection display system according to an embodiment of this application;

DESCRIPTION OF EMBODIMENTS

Figure 3:
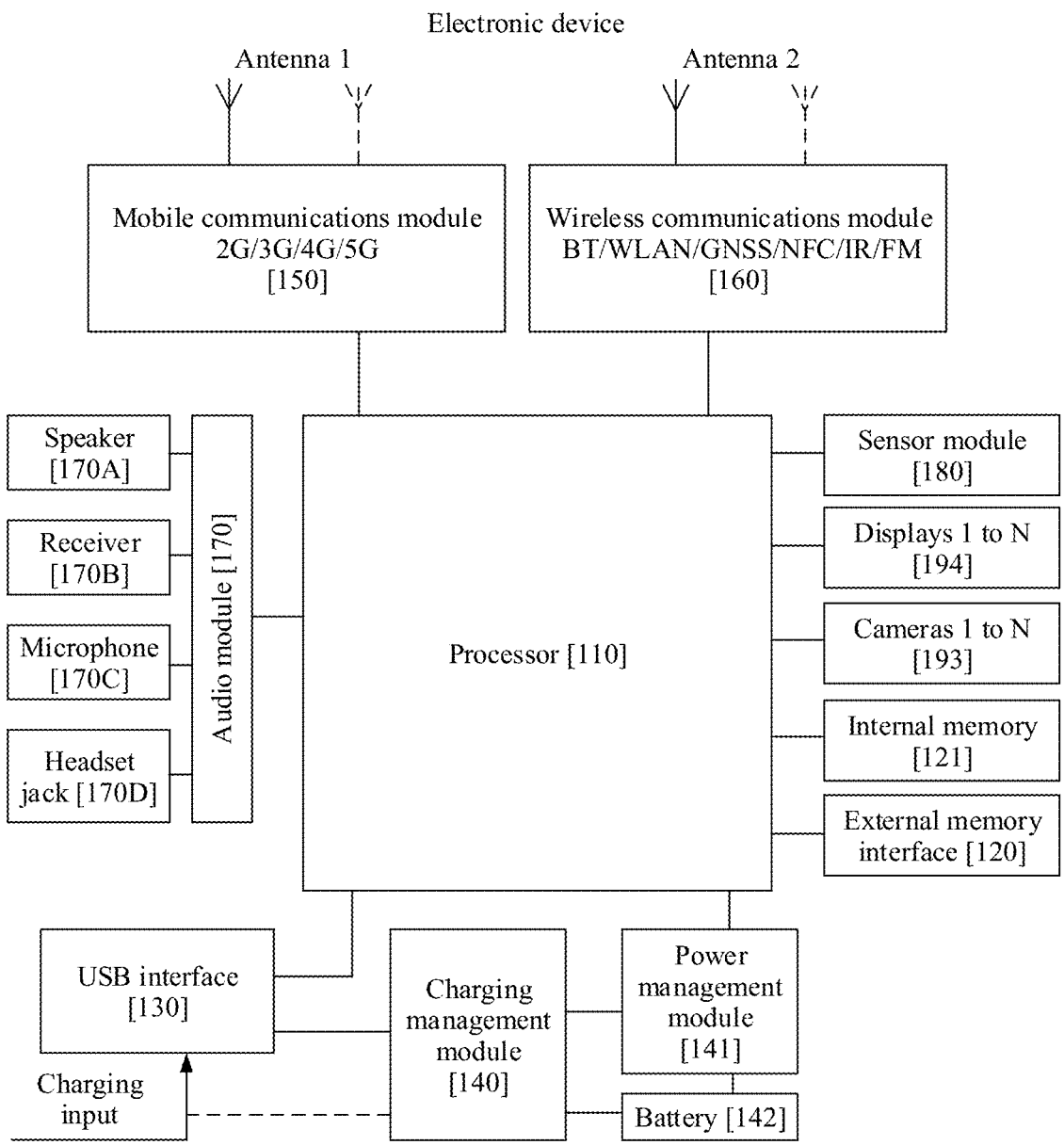
FIG. 3 is a schematic diagram of a structure of an electronic device according to an embodiment of this application.

The following describes implementations of the embodiments in detail with reference to accompanying drawings.

A projection display method provided in the embodiments of this application may be applied to a device group 200 shown in FIG. 1. Electronic devices 100 in the device group 200 may communicate with each other through a local area network (LAN) or a wide area network (WAN).

For example, a mobile phone, a tablet computer, a desktop computer, a smart watch, and a laptop computer of a user may be used as the device group 200. When the user logs in to the mobile phone, the tablet computer, the desktop computer, the smart watch, and the laptop computer by using a same account, the mobile phone, the tablet computer, the desktop computer, and the laptop computer may communicate with each other through a wide area network.

For another example, the mobile phone, the tablet computer, the desktop computer, the smart watch, and the laptop computer of the user may be connected to a same router. In this case, the mobile phone, the tablet computer, the desktop computer, the smart watch, and the notebook computer may form a local area network, and devices in the local area network may communicate with each other through the router.

For another example, the electronic devices 100 may also form a peer-to-peer network (also referred to as a P2P network) through wireless communication (for example, Bluetooth, Wi-Fi, or a ZigBee network). For example, the user can add the mobile phone, the tablet computer, a smart speaker, and the laptop computer to a Wi-Fi network named "1234". The electronic devices 100 in the Wi-Fi network form a P2P network, and all devices in the P2P network are members of the device group 200.

Certainly, the electronic devices 100 in the device group 200 may alternatively be interconnected through a cellular network, or the electronic devices 100 may be interconnected through a transfer device (for example, a USB cable or a dock device), to implement a communications function between the electronic devices 100 in the device group 200. This is not limited in the embodiments of the present invention.

In the embodiments of this application, one or more electronic devices 100 in the device group 200 may be used as source devices, and one or more electronic devices 100 in the device group 200 may be used as destination devices.

The source device may project display content on a display interface of the source device onto the destination device for display.

For example, as shown in FIG. 2A, an electronic device 101 is used as a source device, and both an electronic device 102 and an electronic device 103 may be used as destination devices of the electronic device 101. The electronic device 101 may project display content in a display interface of the electronic device 101 onto both the electronic device 102 and the electronic device 103 for display. In other words, one source device may simultaneously perform projection onto a plurality of destination devices for display.

Alternatively, for example, as shown in FIG. 2B, an electronic device 101 is used as a destination device, and both an electronic device 102 and an electronic device 103 may be used as source devices of the electronic device 101. In this case, the electronic device 102 and the electronic device 103 may simultaneously project display content in display interfaces of the electronic device 102 and the electronic device 103 onto the electronic device 101 for display. In other words, one destination device may receive and display the display content sent by a plurality of source devices.

When a destination device in the device group 200 displays the display content projected by a source device, the destination device may negotiate, based on a quantity of current source devices, a projection parameter used during this projection with each source device. For example, the projection parameter may include one or more of a projection resolution, a transmission bit rate, and an encoding compression rate.

For example, if a current quantity of source devices is relatively small, each source device may set a relatively high resolution of each frame of display image sent during projection. In this way, the destination device may play, based on a relatively high resolution, each frame of display image projected by the source device, and the destination device may increase definition of a display image during projection. In addition, because the quantity of source devices is relatively small, a transmission bandwidth that can be used by the source device during projection is relatively large, a transmission speed is relatively fast, and a load of the destination device is not excessively high. This ensures display smoothness during projection.

Correspondingly, if a current quantity of source devices is relatively large, each source device may set a relatively low resolution of each frame of display image sent during projection. In this way, although a resolution is decreased when the destination device plays the display image projected by the source device, a bandwidth pressure caused when a plurality of source devices transmit display images to the destination device is decreased, and a load of the destination device is also correspondingly reduced. Therefore, display smoothness during projection by the plurality of source devices can be ensured.

In other words, during projection, the source device and the destination device may dynamically negotiate a projection parameter used during projection onto the destination device. When there are a relatively large quantity of source devices, display smoothness during projection can be preferentially ensured by adjusting a projection parameter. When there are a relatively small quantity of source devices, display definition during projection can be preferentially ensured by adjusting a projection parameter, so that a user can obtain a better user experience in different projection scenarios.

In some embodiments, specific structures of the electronic devices in the foregoing device group 200 may be the same or may be different.

For example, each electronic device may be specifically a mobile phone, a tablet computer, a smart TV, a wearable electronic device, a head unit, a laptop computer, an ultra-mobile personal computer (UMPC), a handheld computer, a netbook, a personal digital assistant (PDA), and a virtual reality device. This is not limited in the embodiments of this application.

For example, FIG. 3 is a schematic diagram of a structure of an electronic device.

The electronic device may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a camera 193, a display 194, and the like.

It may be understood that the structure shown in the embodiments of the present disclosure does not constitute a specific limitation on the electronic device. In some other embodiments of this application, the electronic device may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors.

A memory may further be disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor 110 may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device. The charging management module 140 may further supply power to the electronic device by using the power management module 141 while charging the battery 142.

The power management module 141 is configured to connect to the battery 142 and the charging management module 140 to the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the electronic device may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a solution that is for wireless communication including 2G/3G/4G/5G and the like and that is applied to the electronic device. The mobile communications module 150 may include one or more filters, a switch, a power amplifier, a low noise amplifier (LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal to an electromagnetic wave for radiation through the antenna 1. In some embodiments, at least some functional modules of the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, or the like), or displays an image or a video by using the display

194. In some embodiments, the modem processor may be an independent component. In some other embodiments, the modem processor may be independent of the processor 110, and is disposed in a same component as the mobile communications module 150 or another functional module.

The wireless communications module 160 may provide a wireless communications solution that is applied to the electronic device and that includes a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology. The wireless communications module 160 may be one or more components integrating one or more communications processor modules. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device is coupled to the mobile communications module 150, and the antenna 2 is coupled to the wireless communications module 160, so that the electronic device can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), Long Term Evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like. In some embodiments, the electronic device may include one or N displays 194, where N is a positive integer greater than 1.

The electronic device may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1.

The digital signal processor is configured to process a digital signal, and may process another digital signal in addition to the digital image signal. For example, when the electronic device selects a frequency, the digital signal processor is configured to perform Fourier transform on frequency energy.

The video codec is configured to compress or decompress a digital video. The electronic device may support one or more video codecs. Therefore, the electronic device may play or record videos in a plurality of coding formats, for example, moving picture experts group (MPEG)-1, MPEG-2, MPEG-3, and MPEG-4.

The external memory interface 120 may be configured to connect to an external memory card, for example, a micro SD card, to extend a storage capability of the electronic device. The external memory card communicates with the processor 110 through the external memory interface 120, to implement a data storage function. For example, files such as music and a video are stored in the external memory card.

The internal memory 121 may be configured to store one or more computer programs, and the one or more computer programs include instructions. The processor 110 may run the instructions stored in the internal memory 121, so that the electronic device performs the projection display method provided in some embodiments of this application, various functional applications, data processing, and the like. The internal memory 121 may include a program storage area and a data storage area. The program storage area may store an operating system. The program storage area may further store one or more applications (for example, Gallery and Contacts), and the like. The data storage area may store data (for example, Photos and Contacts) created during use of the electronic device. In addition, the internal memory 121 may include a high-speed random access memory, and may further include a non-volatile memory, such as one or more disk storage components, a flash component, or a universal flash storage (UFS). In some other embodiments, the processor 110 runs the instructions stored in the internal memory 121 and/or the instructions stored in the memory disposed in the processor, so that the electronic device performs the projection display method provided in the embodiments of this application, various functional applications, and data processing.

The electronic device may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device may be used to listen to music or answer a hands-free call by using the speaker 170A.

The receiver 170B, also referred to as an "earpiece", is configured to convert an audio electrical signal into a sound signal. When a call is answered or voice information is received by using the electronic device, the receiver 170B may be put close to a human ear to receive a voice.

The microphone 170C, also referred to as a "mic" or a "sound conducting device", is configured to convert a sound signal into an electrical signal. When making a call or sending a voice message, a user may make a sound near the microphone 170C, to enter a sound signal to the microphone 170C. One or more microphones 170C may be disposed in the electronic device. In some other embodiments, two microphones 170C may be disposed in the electronic device, to implement a noise reduction function, in addition to collecting a sound signal. In some other embodiments, three, four, or more microphones 170C may alternatively be disposed in the electronic device, to collect a sound signal and reduce noise. The microphones may further identify a sound source, to implement a directional recording function, and the like.

The headset jack 170D is configured to connect to a wired headset. The headset jack 170D may be the USB interface 130 or a 3.5 mm open mobile terminal platform (OMTP) standard interface or a cellular telecommunications industry association of the USA (CTIA) standard interface.

The sensor module 180 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like. The touch sensor may be disposed on the display. The touch sensor and the display form a touchscreen that is also referred to as a "touch screen".

In addition, the electronic device may further include one or more components such as a button, a motor, an indicator, and a SIM card interface. This is not limited in the embodiments of this application.

The following describes in detail a projection display method provided in the embodiments of this application with reference to the accompanying drawings.

Figure 4:
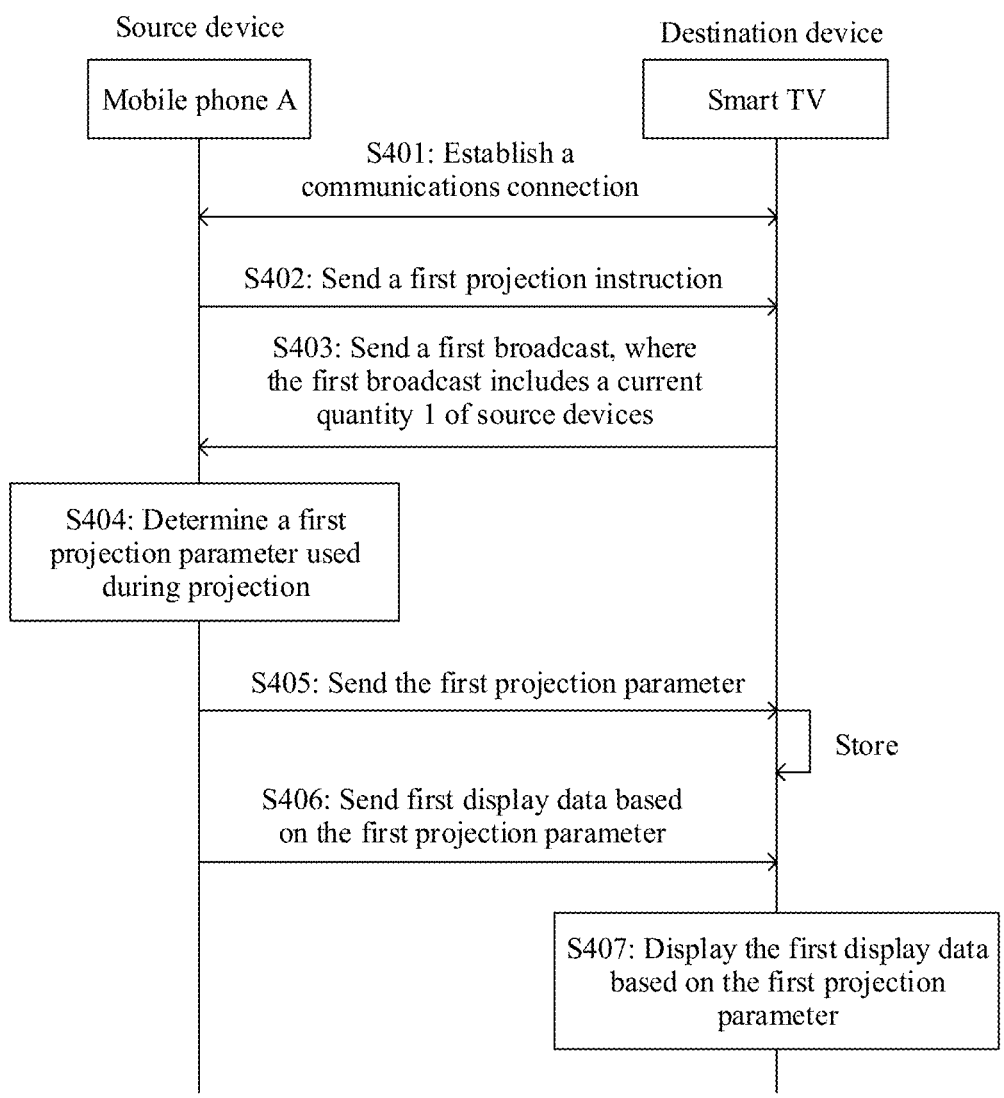
FIG. 4 is a schematic diagram of interactions of a projection display method according to an embodiment of this application.

As shown in FIG. 4, for example, a destination device is a smart TV and a source device is a mobile phone A during projection. An embodiment of this application provides a projection display method, and the method includes the following steps.

S401: The smart TV and the mobile phone A establish a communications connection.

For example, the smart TV and the mobile phone A may establish a communications connection in a wireless manner (for example, Bluetooth, Wi-Fi, or a WLAN direct connection). Alternatively, the smart TV and the mobile phone A may establish a communications connection in a wired manner (for example, a USB cable or a dock device).

Figure 5:
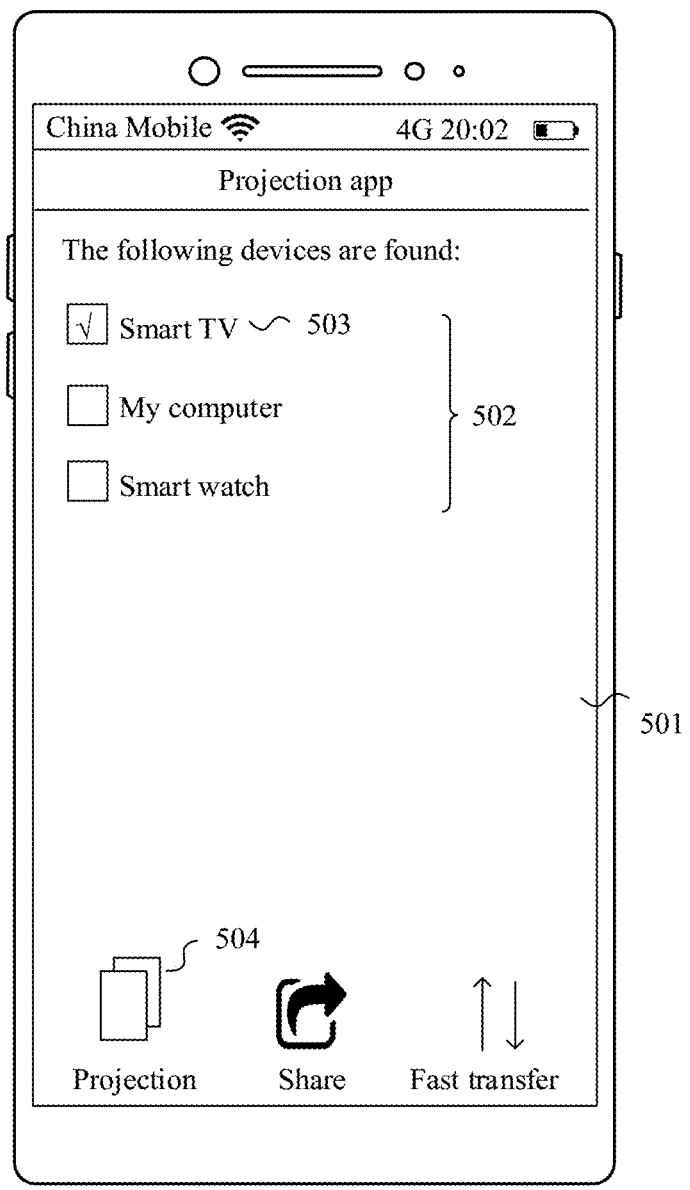
FIG. 5 is a schematic diagram of an application scenario of a projection display method according to an embodiment of this application.

For example, the smart TV and the mobile phone A establish a Wi-Fi connection. A user may enable Wi-Fi functions of the smart TV and the mobile phone A, and the smart TV and the mobile phone A access a same Wi-Fi network. If the user wants to project display content on the mobile phone A onto the smart TV for display, the user may open the smart TV and a projection app installed on the mobile phone A. As shown in FIG. 5, after the user opens the projection app on the mobile phone A, the mobile phone A may display an interface 501. The mobile phone A may display a list 502 of found devices in a same Wi-Fi network in the interface 501. For example, the device list 502 includes an identifier 503 of the smart TV. Further, if it is detected that the user selects the identifier 503 in the device list 502, the mobile phone A may establish a Wi-Fi connection to the smart TV using a WLAN direct connection function.

In addition, after the user selects the identifier 503 in the device list 502, the smart TV may further prompt the user to determine to establish the Wi-Fi connection to the mobile phone A. After the smart TV detects that the user determines to establish the Wi-Fi connection, the mobile phone A may establish the Wi-Fi connection to the smart TV using the WLAN direct connection function.

Figure 6:
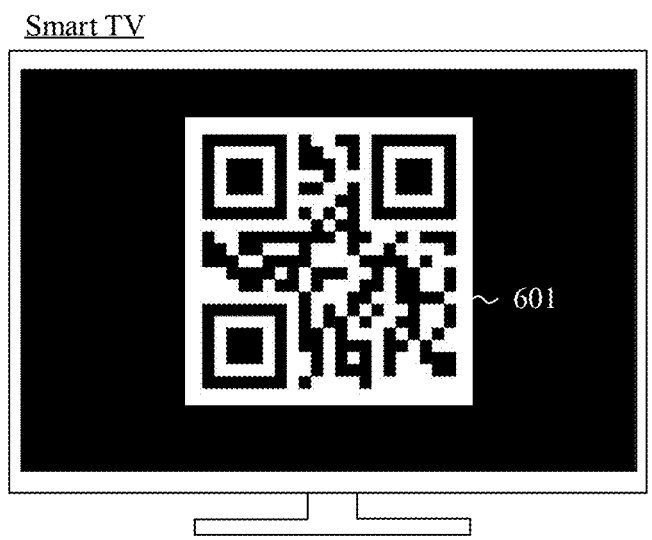
FIG. 6 is a schematic diagram of an application scenario of a projection display method according to an embodiment of this application.

For another example, after the user opens the smart TV and the projection app on the mobile phone A, as shown in FIG. 6, the smart TV may further serve as an access point (AP) by default and display a two-dimensional code 601. The two-dimensional code 601 may carry an identifier of the smart TV, for example, a MAC address or an IP address of the identifier of the TV. Further, the user may scan the two-dimensional code 601 using a code scanning function provided by the projection app on the mobile phone A, to obtain the identifier of the smart TV. In this way, the mobile phone A may establish the Wi-Fi connection to the smart TV using the WLAN direct connection function based on the identifier of the smart TV.

After the smart TV and the mobile phone A establish the communications connection, the smart TV and the mobile phone A form a device group. A quantity of members in the device group may be dynamically increased or decreased.

S402: The mobile phone A sends a first projection instruction to the smart TV.

Still in an example in which the user establishes the Wi-Fi connection between the mobile phone A and the smart TV by using the projection app on the mobile phone A, still as shown in FIG. 5, the interface 501 displayed by the mobile phone A may further include a projection option 504. If it is detected that the user taps the projection option 504 after selecting the identifier 503 of the smart TV, the mobile phone may serve as a source device and send the first projection instruction to a destination device (namely, the smart TV) selected by the user. For example, the projection instruction may include an identifier of the mobile phone A, and after receiving the first projection instruction, the smart TV may determine that a source device that performs subsequent projection is the mobile phone A.

Certainly, after selecting the identifier 503 of the smart TV, the user may also manually set the smart TV as a source device or a destination device in the projection app. When the user sets the smart TV as a target device, the mobile phone A is a source device of the smart TV. When the user sets the smart TV as a source device, the mobile phone A is a destination device of the smart TV. This is not limited in this embodiment of this application.

S403: The smart TV sends a first broadcast in response to the first projection instruction, where the first broadcast includes a current quantity 1 of source devices.

Still in an example in which the smart TV is a destination device, after the smart TV receives the first projection instruction sent by the mobile phone A, the smart TV may determine a quantity of source devices that currently need to perform projection. For example, the smart TV may determine the quantity of source devices based on a current quantity of Wi-Fi connections. If the smart TV currently establishes Wi-Fi connections to N (N>1, and N is an integer) devices, it may be determined that the current quantity of source devices is N. For another example, the smart TV may determine the quantity of source devices based on a quantity of received projection instructions. If the smart TV has currently received projection instructions sent by N devices, it may be determined that the current quantity of source devices is N.

For example, the source device of the smart TV includes only the mobile phone A. After determining that the current quantity of source devices is 1, the smart TV may broadcast the current quantity 1 of source devices to each member in the device group. That is, the smart TV may send, in the device group, the first broadcast that carries the current quantity 1 of source devices.

S404: The mobile phone A determines, based on the current quantity 1 of source devices, a first projection parameter used during projection.

In this embodiment of this application, before projection, the mobile phone A (namely, the source device) may dynamically determine, based on the current quantity of source devices, the first projection parameter used during this projection. The first projection parameter may include one or more of a projection resolution, a transmission bit rate, an encoding compression rate, and the like.

For example, the projection resolution is used as an example. When the source device (for example, the mobile phone A) performs projection onto the destination device (for example, the smart TV), each frame of display interface of the mobile phone A may be sent to the smart TV in a form of an image for display. In the conventional technology, a resolution (namely, the projection resolution) of each frame of image sent when the mobile phone A performs projection onto the smart TV is fixed. For example, if a resolution of the mobile phone A is 1080p (that is, 1920×1080), the mobile phone A may send each frame of image based on the projection resolution 1080p. However, when there are a relatively large quantity of source devices of the smart TV, if each source device transmits, based on the projection resolution 1080p, display data used during projection, a transmission bandwidth that can be used by each source device is significantly reduced, and a processing capability of the smart TV is also significantly reduced. As a result, frame freezing occurs on the destination device during projection.

In this embodiment of this application, after receiving the first broadcast sent by the smart TV, the mobile phone A may determine, based on the current quantity of source devices in the first broadcast, a projection resolution of each frame of display interface during subsequent projection. For example, if the current quantity of source devices is 1, the mobile phone A may determine that a projection resolution of a display interface sent to the smart TV during projection is 1080p. If the current quantity of source devices is 2, the mobile phone A may determine that a projection resolution of a display interface sent to the smart TV during projection is 720p (that is, 1280×720). In other words, a larger quantity of source devices indicates a lower projection resolution determined by the mobile phone A, and a smaller quantity of source devices indicates a higher projection resolution determined by the mobile phone A.

For example, the mobile phone A may pre-store a correspondence between different quantities of source devices and projection resolutions. After obtaining the first broadcast, the mobile phone may find, based on the correspondence, the projection resolution corresponding to the current quantity 1 of source devices. In this way, when there are a relatively large quantity of projection source devices, the mobile phone A (namely, the source device) may decrease a projection resolution, to improve display smoothness of the destination device during projection. Correspondingly, when there are a relatively small quantity of projection source devices, the mobile phone A (namely, the source device) may increase a projection resolution, to improve display definition of the destination device during projection.

For example, the encoding compression rate is used as an example. To reduce an amount of data transmitted during projection, when sending, to the smart TV (namely, the destination device), display data that needs to be projected for display, the mobile phone A (namely, the source device) performs encoding and compression on the display data by using a specific codec protocol. For example, the codec protocol may be H.263, H.264, or H.265. In the conventional technology, the mobile phone A performs projection onto the smart TV by using a fixed encoding compression rate. However, when there are a relatively large quantity of source devices of the smart TV, if each source device performs encoding based on a same encoding compression rate, a transmission bandwidth that can be used by each source device is significantly reduced, and a processing capability of the smart TV is also significantly reduced. As a result, frame freezing occurs on the destination device during projection.

In this embodiment of this application, after receiving the first broadcast sent by the smart TV, the mobile phone A may determine, based on the current quantity of source devices in the first broadcast, an encoding compression rate used during subsequent projection. For example, a larger quantity of source devices indicates a larger encoding compression rate determined by the mobile phone A, and a smaller quantity of source devices indicates a smaller encoding compression rate determined by the mobile phone A during projection.

A codec protocol specified in H.264 is used as an example. When encoding a data stream formed by frames of display interfaces, the source device (for example, the mobile phone A) may sequentially encode the data stream into a plurality of I frames and a plurality of P frames. The I frame is also referred to as an intra frame, is an independent frame that carries all information, and can be independently decoded without using another picture as reference. The P frame is also referred to as an inter-frame predicted frame, and can be encoded only by using a previous I frame as reference. The P frame is used to indicate a difference between a current frame and a previous frame (the previous frame may be an I frame or a P frame). An amount of data used when the source device transmits the I frame is much greater than an amount of data used when the source device transmits the P frame.

For example, the mobile phone A may use a quantity of P frames between adjacent I frames to indicate the encoding compression rate. A larger quantity of P frames between adjacent I frames indicates a higher encoding compression rate and a smaller amount of data transmitted by the source device during projection. A smaller quantity of P frames between adjacent I frames indicates a lower encoding compression rate and a larger amount of data transmitted by the source device during projection.

For example, the mobile phone A may pre-store a correspondence between different quantities of source devices and encoding compression rates. For example, when the quantity of source devices is 1, the quantity of P frames between adjacent I frames may be set to 5. When the quantity of source devices is 2, the quantity of P frames between adjacent I frames may be set to 10. After obtaining the first broadcast, the mobile phone may find, based on the correspondence, the encoding compression rate corresponding to the current quantity 1 of source devices.

In this way, when there are a relatively large quantity of projection source devices, the mobile phone A (namely, the source device) may increase an encoding compression rate, to improve display smoothness of the destination device during projection. Correspondingly, when there are a relatively small quantity of projection source devices, the mobile phone A (namely, the source device) may decrease an encoding compression rate, to improve display definition of the destination device during projection.

In addition, the encoding compression rate and the transmission bit rate meet a specific functional relationship. After the mobile phone A sets the encoding compression rate, the transmission bit rate during projection is fixed accordingly. After the mobile phone A sets the transmission bit rate, the encoding compression rate during projection is also fixed. Usually, a higher encoding compression rate corresponds to a lower transmission bit rate. When there are a relatively large quantity of projection source devices, the mobile phone A (namely, the source device) may decrease a transmission bit rate, to improve display smoothness of the destination device during projection. Correspondingly, when there are a relatively small quantity of projection source devices, the mobile phone A (namely, the source device) may increase a transmission bit rate, to improve display definition of the destination device during projection.

For example, when determining the first projection parameter, the mobile phone A may determine one of the encoding compression rate and the transmission bit rate based on the quantity of source devices, and further, the mobile phone A may determine the other one of the encoding compression rate and the transmission bit rate based on the functional relationship between the encoding compression rate and the transmission bit rate.

For example, the mobile phone may pre-store a correspondence between different quantities of source devices and transmission bit rates. For example, when the quantity of source devices is 1, a corresponding transmission bit rate is 5 M. When the quantity of source devices is 2, a corresponding transmission bit rate is 2 M. After obtaining the first broadcast, the mobile phone may also determine, based on the correspondence, the transmission bit rate corresponding to the current quantity of source devices. Further, the mobile phone may determine, based on the functional relationship between the encoding compression rate and the transmission bit rate, the encoding compression rate corresponding to the transmission bit rate.

In addition, the mobile phone A may support one or more codec protocols, and the smart TV may also support one or more codec protocols. The mobile phone A and the smart TV may further negotiate a codec protocol used this time before projection. For example, the smart TV may use the first broadcast to carry the codec protocols H.264 and H.265 supported by the smart TV. After receiving the first broadcast, the mobile phone A may select one of the codec protocols H.264 and H.265. For example, the mobile phone A selects the codec protocol H.265. The mobile phone A may send an identifier corresponding to the codec protocol H.265 to the smart TV. In this way, both the smart TV and the mobile phone A may determine that the codec protocol used during this projection is H.265.

In some other embodiments, the smart TV may also provide the user with a setting option or a setting menu for manually setting a projection parameter. For example, before sending the first broadcast to the source device in the device group, the smart TV may display a first option "definition first" and a second option "smoothness first". If it is detected that the user selects the first option, the smart TV may use the first broadcast to carry an identifier (for example, an identifier A) of "definition first". If it is detected that the user selects the second option, the smart TV may use the first broadcast to carry an identifier (for example, an identifier B) of "smoothness first".

If the mobile phone A parses the identifier A from the first broadcast, when setting the first projection parameter, the mobile phone A may increase the projection parameter, increase the transmission bit rate, or decrease the encoding compression rate etc., to ensure that the users' requirement for definition is preferentially met during projection. Correspondingly, if the mobile phone A parses the identifier B from the first broadcast, when setting the first projection parameter, the mobile phone A may decrease the projection parameter, decrease the transmission bit rate, or increase the encoding compression rate etc., to ensure that the users' requirement for smoothness is preferentially met during projection.

Certainly, the smart TV and the mobile phone A may also automatically negotiate, according to the foregoing method, the first projection parameter used during this projection, and the user may manually modify the first projection parameter in a setting menu of the mobile phone A or the smart TV. Further, the smart TV and the mobile phone A may perform projection display based on the first projection parameter manually modified by the user. This is not limited in this embodiment of this application.

S405: The mobile phone A sends the first projection parameter to the smart TV for storage.

Usually, a display capability of a large-screen device (for example, the smart TV) is higher than a display capability of a mobile terminal such as the mobile phone A. Therefore, the smart TV can usually support the first projection parameter determined by the mobile phone A. After determining the first projection parameter used during projection, the mobile phone A may send the first projection parameter to the smart TV for storage, so that the smart TV subsequently decodes and displays, based on the first projection parameter, the display data sent by the mobile phone A.

Alternatively, after determining, based on the current quantity 1 of source devices, the first projection parameter used during projection, the mobile phone A may send the first projection parameter to the smart TV for negotiation. For example, the first projection parameter determined by the mobile phone A includes: a projection resolution 1080p and a transmission bit rate 5 M. After receiving the first projection parameter, the smart TV may determine whether the smart TV supports the first projection parameter. If the smart TV does not support the projection resolution 1080p or the transmission bit rate 5 M, the smart TV may send a plurality of projection resolutions or a plurality of transmission bit rates supported by the smart TV to the mobile phone A. The mobile phone A may re-determine the first projection parameter from the plurality of projection resolutions or the plurality of transmission bit rates sent by the smart TV.

Certainly, after receiving the first projection parameter sent by the mobile phone A, if the smart TV determines that the display capability of the smart TV can support the first projection parameter, the smart TV may store the first projection parameter, so that the smart TV subsequently decodes and displays, based on the first projection parameter, the display data sent by the mobile phone A.

It should be noted that, the foregoing embodiment describes an example in which the mobile phone A determines, based on the current quantity of source devices, the first projection parameter of the mobile phone A used during projection. It may be understood that the smart TV may also determine, for the mobile phone A based on the current quantity of source devices, the first projection parameter used during projection.

For example, the smart TV may obtain, from a server, a configuration file corresponding to the mobile phone A. The configuration file records projection parameters such as projection resolutions and encoding compression rates corresponding to different quantities of source devices. If the current quantity of source devices is 1, the smart TV may determine the first projection parameter corresponding to the source device in the configuration file. In addition, the smart TV may send the determined first projection parameter to the mobile phone A for storage, so that the mobile phone A subsequently encodes, based on the first projection parameter, display data to be projected onto the smart TV.

S406: The mobile phone A sends, to the smart TV based on the first projection parameter, first display data that is being displayed on the mobile phone A.

After the mobile phone A negotiates with the smart TV to obtain the first projection parameter used during this projection, the mobile phone may generate, based on the first projection parameter, display data that needs to be projected onto the smart TV.

Figure 7:
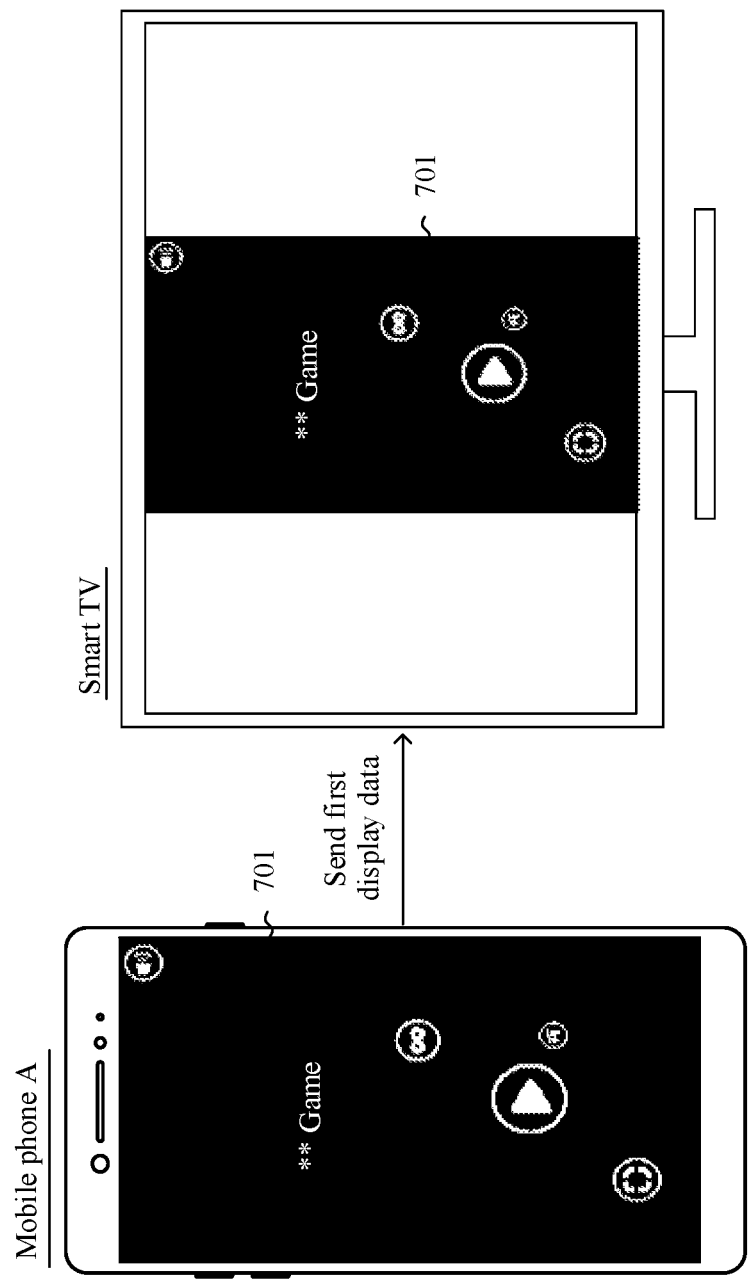
FIG. 7A and FIG. 7B are schematic diagrams of an application scenario of a projection display method according to an embodiment of this application.

For example, as shown in FIG. 7A, after enabling a projection function on the mobile phone A, the user opens a game app to display a first interface 701. In this case, the mobile phone A needs to project the first interface 701 onto the smart TV for display. The mobile phone A may encode the first interface 701 based on the negotiated projection resolution and encoding compression rate in the first projection parameter, and send a data stream (namely, the first display data) generated after the encoding to the smart TV.

It should be noted that the mobile phone A may encode the entire first interface 701 based on the first projection parameter, or may encode some display content in the first interface 701 based on the first projection parameter. In other words, the mobile phone A may project the entire first interface 701 onto the smart TV for display, or may project some display content in the first interface 701 onto the smart TV for display. This is not limited in this embodiment of this application.

S407: The smart TV displays the first display data based on the first projection parameter.

Still in an example in which the mobile phone A projects the first interface 701 onto the smart TV, as shown in FIG. 7B, after receiving the first display data sent by the mobile phone A, the smart TV may decode and display the first display data based on the negotiated first projection parameter. For example, the smart TV may restore the first interface 701 in a decoding manner corresponding to the encoding compression rate in the first projection parameter, and display the first interface 701 based on the projection resolution in the first projection parameter.

Figure 8:
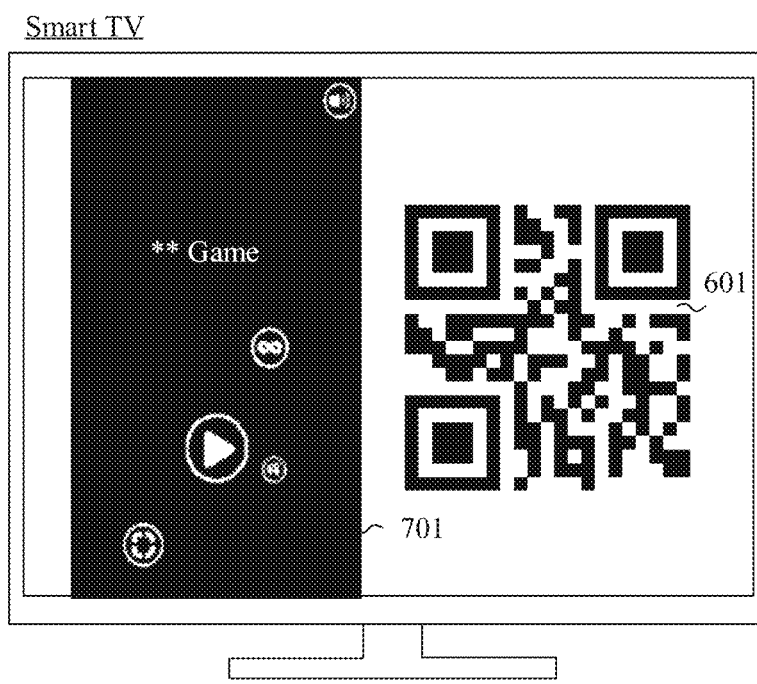
FIG. 8 is a schematic diagram of an application scenario of a projection display method according to an embodiment of this application.

For example, as shown in FIG. 7B, the smart TV may display, based on the first projection parameter, the first interface 701 projected by the mobile phone A in the middle. For another example, as shown in FIG. 8, the smart TV may further display the first interface 701 in a preset area 1 based on the first projection parameter, and the smart TV may continue to display the two-dimensional code 601 in a preset area 2. Another source device may still establish a communications connection to the smart TV by scanning the two-dimensional code 601 and start projection.

Figure 9B:
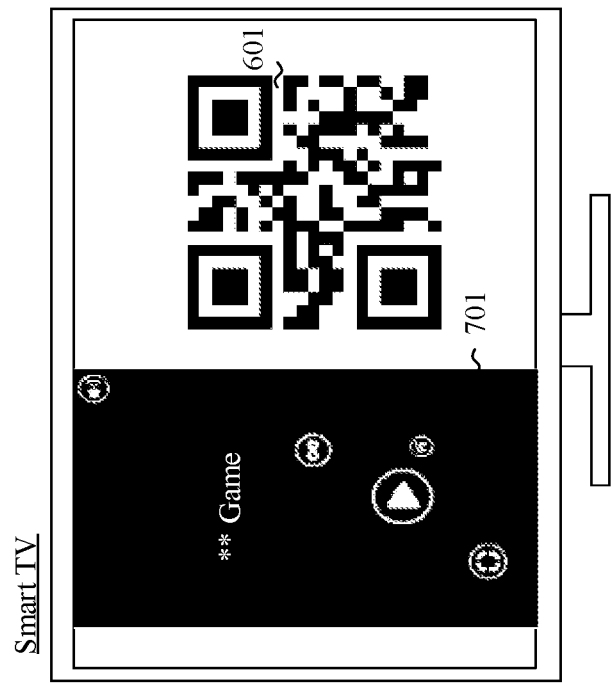
FIG. 9A and FIG. 9B are schematic diagrams of an application scenario of a projection display method according to an embodiment of this application.
Figure 9A:
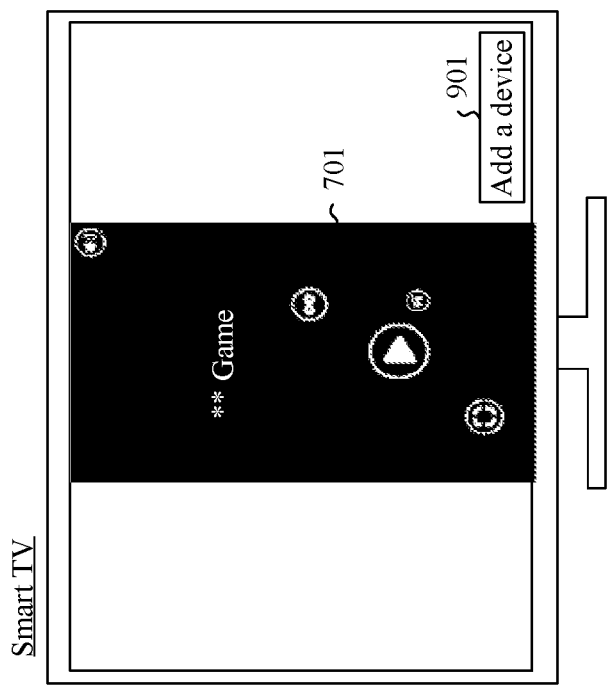

For another example, as shown in FIG. 9A, when displaying the first interface 701 projected by the mobile phone A, the smart TV may further hide the two-dimensional code 601. In addition, the smart TV may display an option 901 used to call out the two-dimensional code 601. If it is detected that the user selects the option 901 on the smart TV, as shown in FIG. 9B, the smart TV may display the two-dimensional code 601 again while displaying the first interface 701, so that the another source device establishes the communications connection to the smart TV by scanning the two-dimensional code 601 and starts projection.

In the foregoing embodiment, an example in which the quantity of source devices (namely, the mobile phone A) of the smart TV is 1 is used for description. It may be understood that the smart TV may dynamically receive display data sent by one or more source devices for projection display. When the quantity of source devices of the smart TV changes, a projection parameter used by each source device during projection onto the smart TV also changes dynamically.

Figure 10:
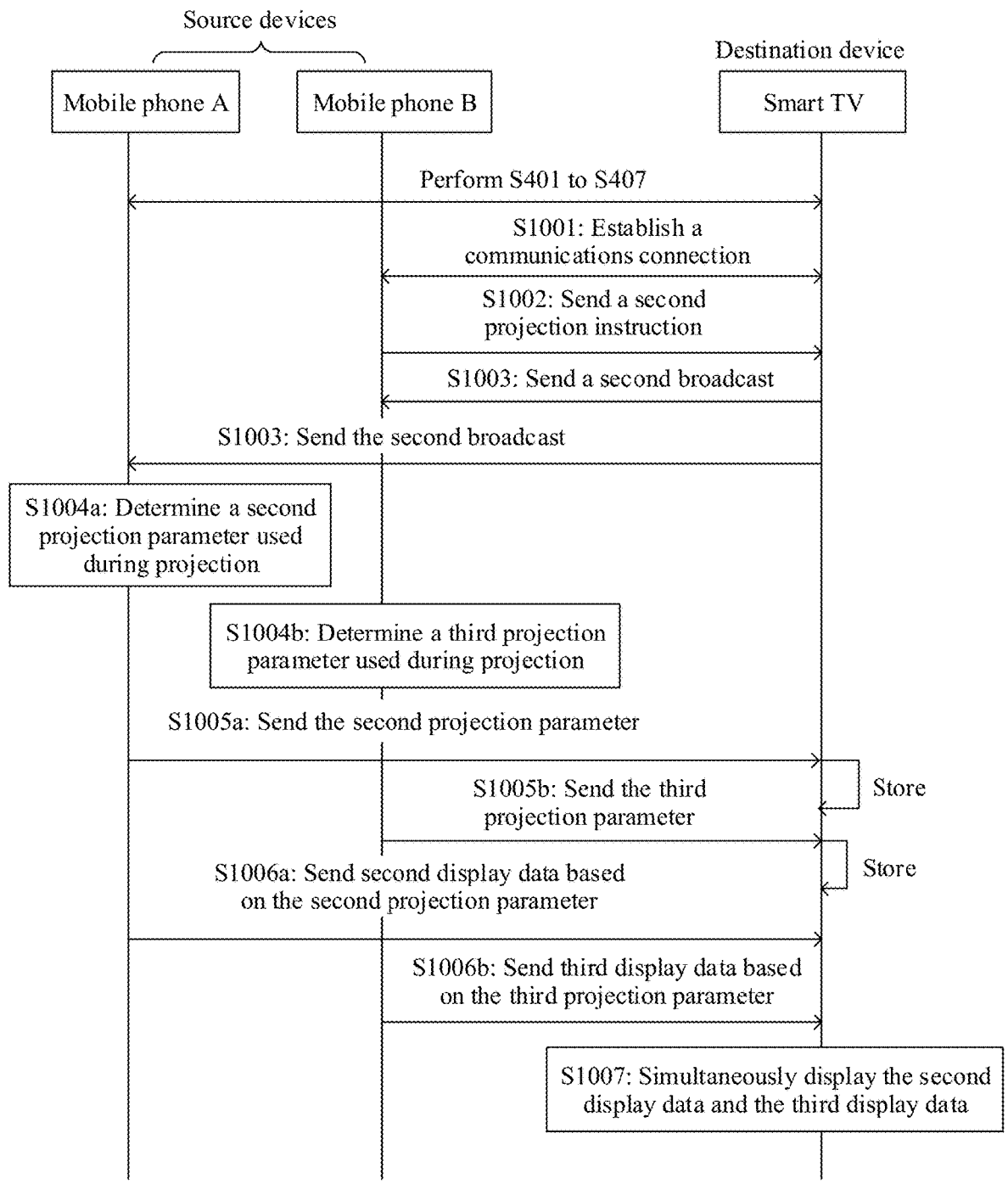
FIG. 10 is a schematic diagram of interactions of a projection display method according to an embodiment of this application.

For example, in a process in which the mobile phone A projects the display data onto the smart TV, the another source device may further establish the communications connection to the smart TV, and project display data of the another source device onto the smart TV. In an example in which a mobile phone B is a newly added source device of the smart TV, as shown in FIG. 10, the projection display method provided in this embodiment of this application further includes the following steps.

S1001: The smart TV and the mobile phone B establish a communications connection.

A process in which the smart TV and the mobile phone B establish the communications connection is similar to a process in which the smart TV and the mobile phone A establish the communications connection in step S401. For example, the mobile phone B may scan the two-dimensional code 601 shown in FIG. 9B, to obtain the identifier of the smart TV, and establish a Wi-Fi connection to the smart TV based on the identifier of the smart TV. Details are not described in this embodiment of this application.

After the smart TV and the mobile phone B establish the communications connection, if the smart TV still maintains the communications connection to the mobile phone A, the smart TV, the mobile phone A, and the mobile phone B form a device group. Similarly, a quantity of members in the device group may be dynamically increased or decreased.

S1002: The mobile phone B sends a second projection instruction to the smart TV.

A process in which the mobile phone B sends the second projection instruction to the smart TV is similar to a process in which the mobile phone A sends the first projection instruction to the smart TV in step S402. Therefore, details are not described herein again.

S1003: The smart TV sends a second broadcast in response to the second projection instruction, where the second broadcast includes a current quantity 2 of source devices.

After the smart TV receives the second projection instruction sent by the mobile phone B, it indicates that a new source device joins this projection process, and the smart TV may re-determine the quantity of source devices that currently need to perform projection.

For example, the source devices of the smart TV include the mobile phone A and the mobile phone B. After determining that the current quantity of source devices is 2, the smart TV may broadcast the current quantity 2 of source devices to each member in the device group. That is, the smart TV may send, in the device group, the second broadcast that carries the current quantity 2 of source devices. Both the mobile phone A and the mobile phone B in the device group may receive the second broadcast.

S1004a: The mobile phone A determines, based on the current quantity 2 of source devices, a second projection parameter used during projection.

Similar to step S404, in step S1004a, after receiving the quantity 2 of source devices in the second broadcast, the mobile phone A may determine the second projection parameter corresponding to the quantity 2 of the source devices. Similar to the first projection parameter, the second projection parameter may include one or more of a projection resolution, a transmission bit rate, and an encoding compression rate.

For example, if the current quantity of source devices is 2, the mobile phone A may decrease the projection resolution in the second projection parameter from 1080p to 720p based on the pre-stored correspondence between different quantities of source devices and projection resolutions.

For another example, if the current quantity of source devices is 2, the mobile phone A may set the encoding compression rate in the second projection parameter to one I frame every 10 P frames based on the pre-stored correspondence between different quantities of source devices and encoding compression rates.

In other words, after the quantity of source devices increases, the second projection parameter determined by the mobile phone A may preferentially ensure display smoothness during projection, to avoid problems such as display freezing and a delay of the destination device caused by simultaneous projection of a plurality of source devices after the quantity of source devices increases.

S1005a: The mobile phone A sends the second projection parameter to the smart TV for storage.

Similar to step S405, in step S1005a, after determining the second projection parameter, the mobile phone A may send the second projection parameter to the smart TV. If the display capability of the smart TV supports the second projection parameter, the smart TV may store the second projection parameter. Otherwise, the smart TV may continue to negotiate, with the mobile phone A, the second projection parameter used when there are two source devices.

S1006a: The mobile phone A sends, to the smart TV based on the second projection parameter, second display data that is being displayed on the mobile phone A.

Similar to step S406, in step S1006a, after the mobile phone A negotiates with the smart TV to obtain the second projection parameter used during subsequent projection, the mobile phone may generate, based on the second projection parameter, the second display data that needs to be projected onto the smart TV.

Figure 11:
FIG. 11 is a schematic diagram of an application scenario of a projection display method according to an embodiment of this application.

As shown in FIG. 7A, the mobile phone A originally projects display data (namely, the first display data) of the first interface 701 onto the smart TV based on the first projection parameter. After the mobile phone B joins this projection as a source device, the mobile phone A renegotiates with the smart TV to obtain the second projection parameter used during subsequent projection. In this case, as shown in FIG. 11, if the mobile phone A is displaying a second interface 1101 of the game app, the mobile phone A may send display data (namely, the second display data) of the second interface 1101 to the smart TV based on the second projection parameter.

S1004b: The mobile phone B determines, based on the current quantity 2 of source devices, a third projection parameter used during projection.

Similar to step S1004a, in step S1004b, after receiving the quantity 2 of source devices in the second broadcast, the mobile phone B may determine the third projection parameter corresponding to the quantity 2 of the source devices. Similar to the first projection parameter and the second projection parameter, the third projection parameter may include one or more of a projection resolution, a transmission bit rate, and an encoding compression rate.

The third projection parameter may be the same as or different from the second projection parameter. In other words, specific projection parameters negotiated by the source devices and the destination device may be the same or different. Similar to the second projection parameter, when there are a relatively large quantity of source devices, the third projection parameter determined by the mobile phone B may preferentially ensure display smoothness during projection, to avoid problems such as display freezing and a delay of the destination device caused by simultaneous projection of a plurality of source devices after the quantity of source devices increases.

Correspondingly, if the quantity of source devices that perform projection onto the smart TV decreases, a probability that frame freezing occurs on the smart TV during projection is relatively small, and a projection parameter determined by the source device in this case may preferentially ensure display definition during projection. In this way, the user can obtain better use experience in different projection scenarios.

S1005b: The mobile phone B sends the third projection parameter to the smart TV for storage.

Similar to step S1005a, in step S1005b, after determining the third projection parameter, the mobile phone B may send the third projection parameter to the smart TV. If the display capability of the smart TV supports the third projection parameter, the smart TV may store the third projection parameter. Otherwise, the smart TV may continue to negotiate, with the mobile phone B, the third projection parameter used when there are two source devices.

S1006b: The mobile phone B sends, to the smart TV based on the third projection parameter, third display data that is being displayed on the mobile phone B.

Similar to step S1006a, in step S1006b, after the mobile phone B negotiates with the smart TV to obtain the third projection parameter used during subsequent projection, the mobile phone may generate, based on the third projection parameter, the third display data that needs to be projected onto the smart TV.

Figure 12:
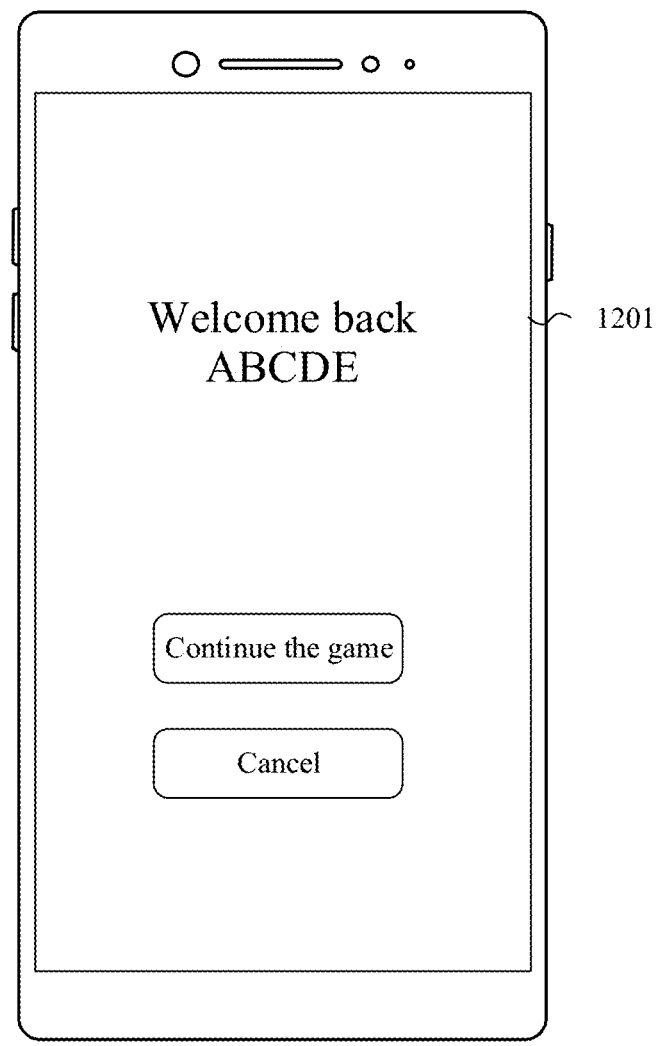
FIG. 12 is a schematic diagram of an application scenario of a projection display method according to an embodiment of this application.

As shown in FIG. 12, after the mobile phone B joins this projection as a source device, the mobile phone B may display a third interface 1201 of a game app. After negotiating the third projection parameter used during subsequent projection with the smart TV, the mobile phone B may send display data (namely, the third display data) of the third interface 1201 to the smart TV based on the third projection parameter.

S1007: The smart TV simultaneously displays the second display data and the third display data on a display interface.

Figure 13:
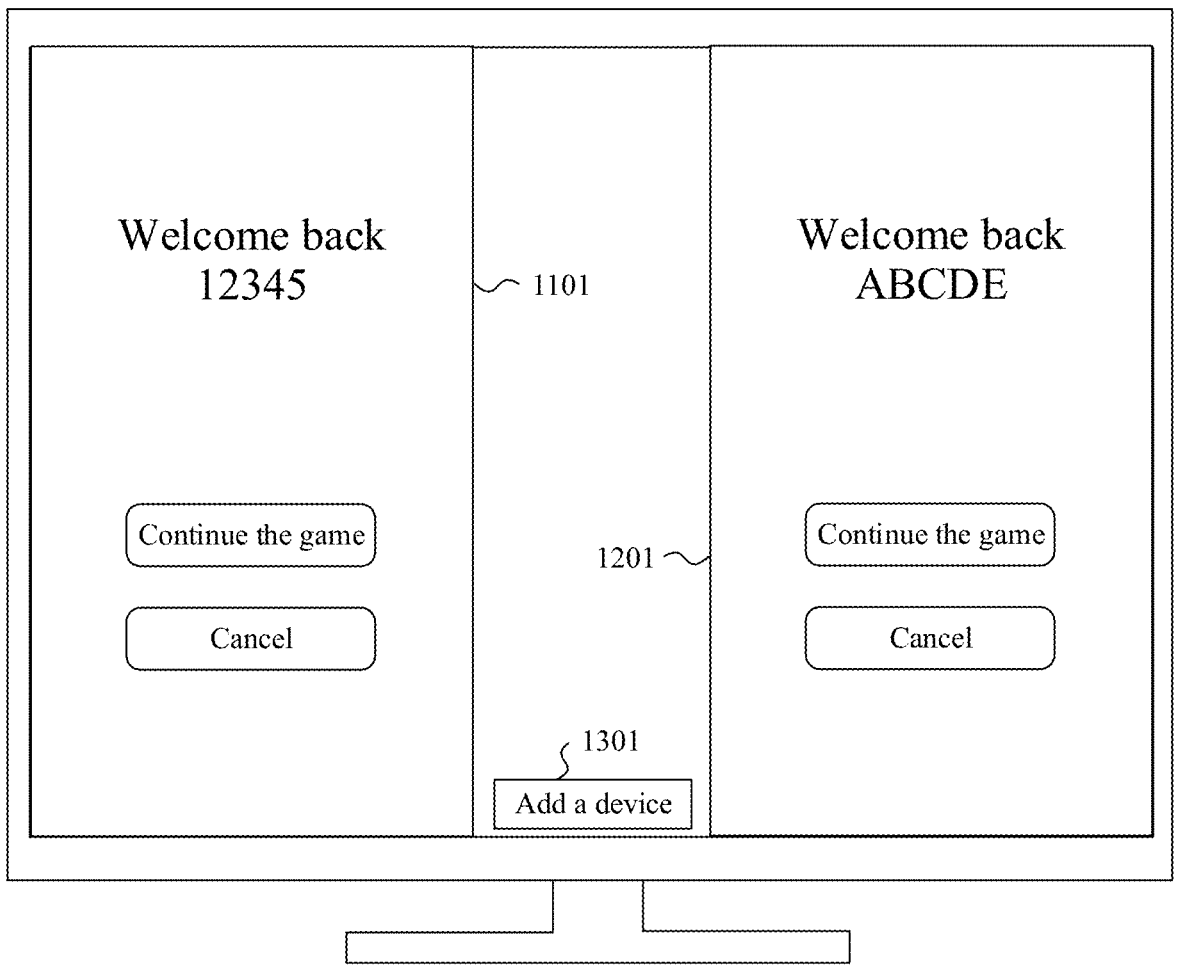
FIG. 13 is a schematic diagram of an application scenario of a projection display method according to an embodiment of this application.

As shown in FIG. 13, after receiving the second display data sent by the mobile phone A, the smart TV may decode the second display data based on the second projection parameter negotiated with the mobile phone A, and display, in a first preset area of the smart TV based on the second projection parameter, the second interface 1101 corresponding to the second display data.

In addition, still as shown in FIG. 13, after receiving the third display data sent by the mobile phone B, the smart TV may decode the third display data based on the third projection parameter negotiated with the mobile phone B, and display, in a second preset area of the smart TV based on the third projection parameter, the third interface 1201 corresponding to the third display data.

In this way, the smart TV, as the destination device, may simultaneously receive display data sent by one or more source devices for projection. In addition, when the quantity of source devices changes, the destination device may renegotiate projection parameters used during this projection with the source devices. When there are a relatively large quantity of source devices, display smoothness during projection can be preferentially ensured by adjusting a projection parameter. When there are a relatively small quantity of source devices, display definition during projection can be preferentially ensured by adjusting a projection parameter, so that the user can obtain better use experience in different projection scenarios.

Figure 14:
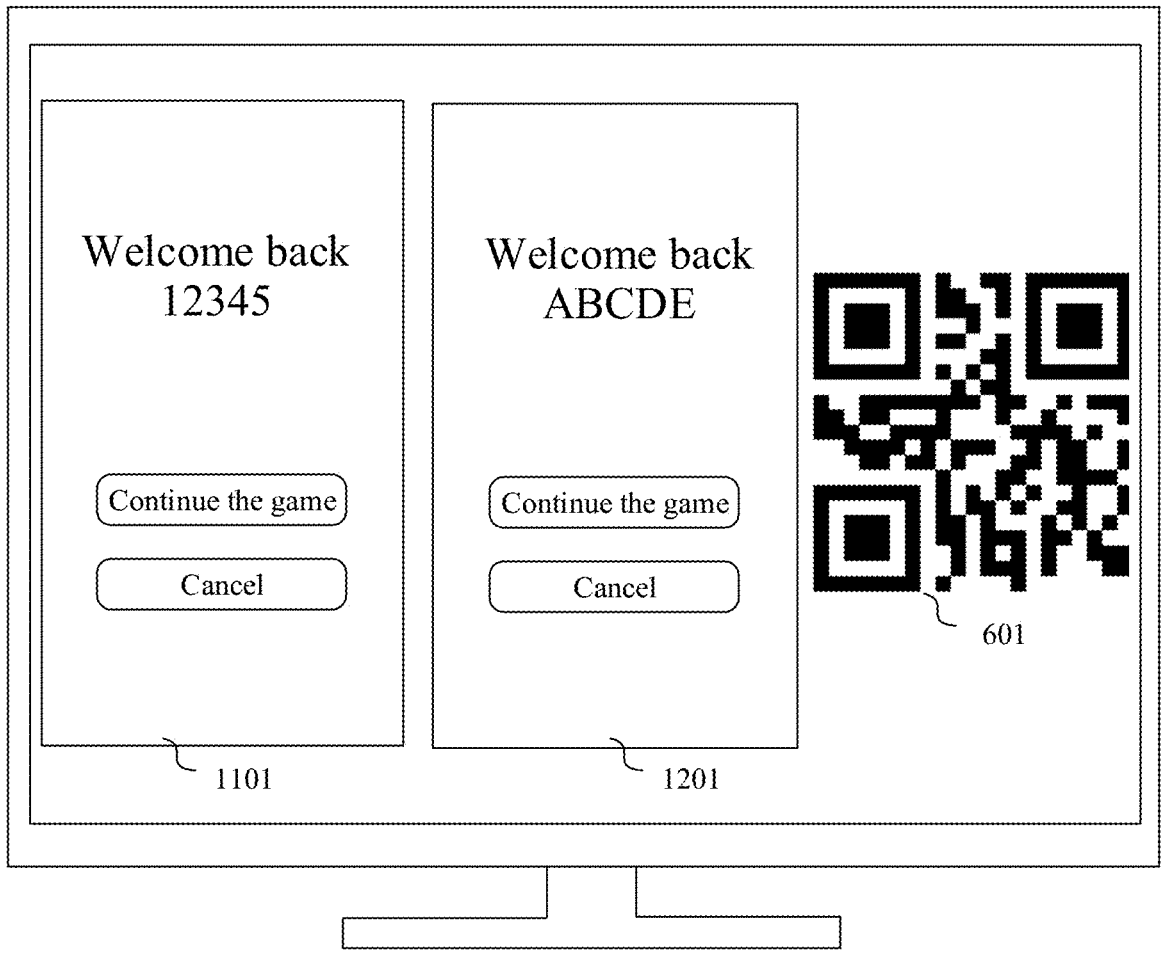
FIG. 14 is a schematic diagram of an application scenario of a projection display method according to an embodiment of this application.

In addition, still as shown in FIG. 13, when displaying the second interface 1101 and the third interface 1201, the smart TV may further display an option 1301 used to call out the two-dimensional code 601. If it is detected that the user selects the option 1301 on the smart TV, as shown in FIG. 14, the smart TV may display the two-dimensional code 601 of the smart TV again while displaying the second interface 1101 and the third interface 1201, so that another source device establishes a communications connection to the smart TV by scanning the two-dimensional code 601 and starts projection.

In this case, when a new device is added to the device group to perform projection onto the smart TV, the smart TV may continue to negotiate with each source device according to the foregoing method for a projection parameter used by each source device after the quantity of source devices changes.

Similarly, if it is detected that an existing source device exits this projection, the smart TV may also continue to negotiate with each source device according to the foregoing method for a projection parameter used by each source device after the quantity of source devices changes.

For example, when the smart TV detects that the communications connection between the mobile phone A and the smart TV is disconnected, or the smart TV detects an instruction that is sent by the mobile phone A to stop projection, the smart TV may determine that the current quantity of source devices is decreased from 2 to 1. Further, the smart TV may send a third broadcast to the source device in the device group, where the third broadcast includes a current quantity 1 of source devices. In this case, the source device in the device group includes only the mobile phone B. After the mobile phone B receives the third broadcast, similar to steps S404 and S405, the mobile phone B may determine, based on the current quantity 1 of source devices, a third projection parameter used during projection, and send the determined third projection parameter to the smart TV for storage. Because the quantity of source devices in the device group is decreased, when determining the third projection parameter, the mobile phone B may increase a projection resolution, decrease a compression coding rate, or increase a transmission bit rate, to improve display definition of the destination device (namely, the smart TV) during projection. Subsequently, both the mobile phone B and the smart TV may perform projection display based on the third projection parameter negotiated this time.

In some other embodiments of this application, during projection, the destination device may further deliver a reference threshold of a projection parameter to each source device based on the quantity of source devices. In this way, each source device may determine an appropriate projection parameter within the reference threshold based on a projection capability of the device, and perform projection onto the destination device based on the determined projection parameter.

Figure 15:
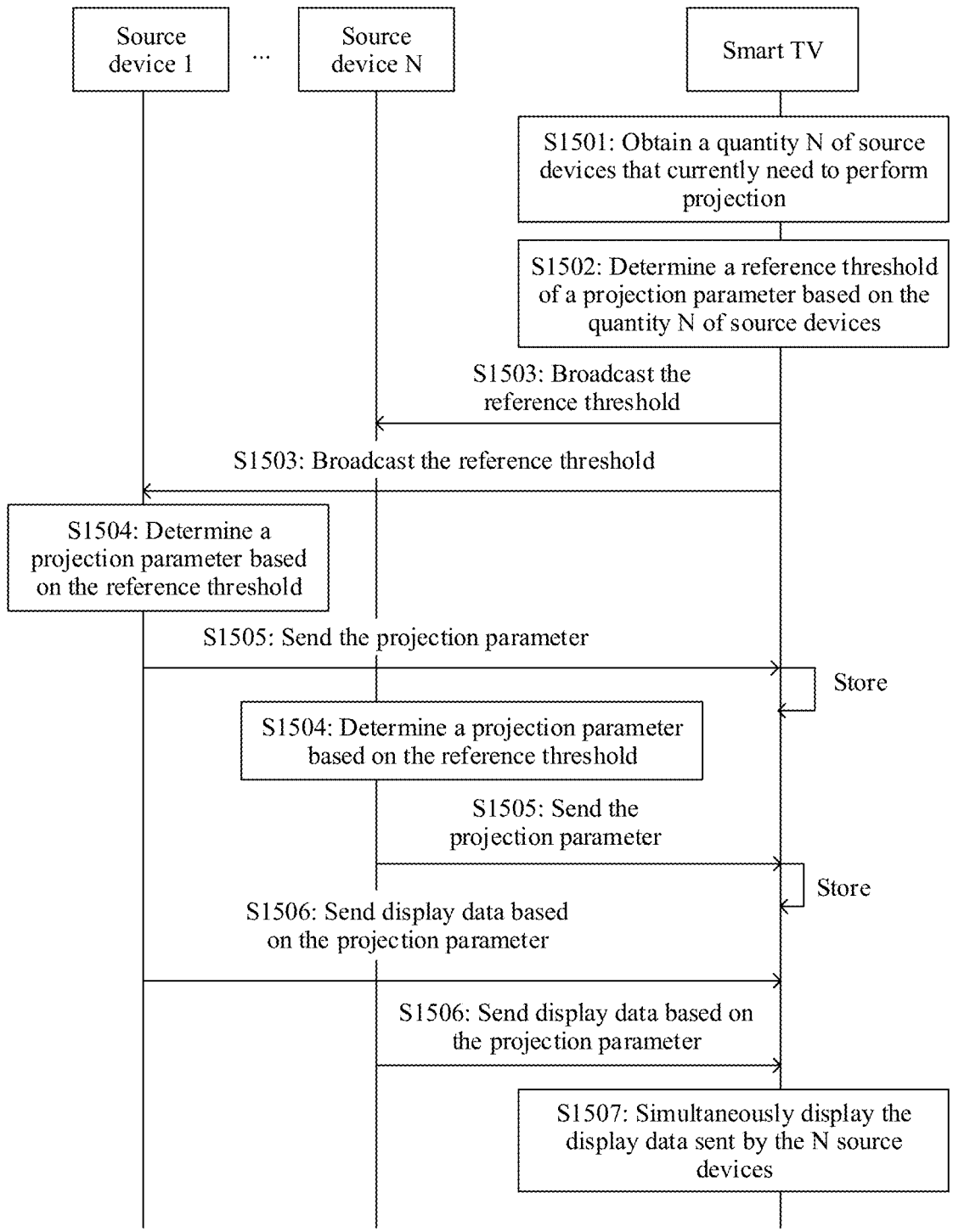
FIG. 15 is a schematic diagram of interactions of a projection display method according to an embodiment of this application.

For example, the smart TV is still used as a destination device. As shown in FIG. 15, a projection display method provided in this embodiment of this application includes the following steps.

S1501: When detecting that a source device joins or exits, the smart TV obtains a quantity N of source devices that currently need to perform projection.

The smart TV can monitor in real time a new source device that joins a device group or a source device that disables a projection function in a device group. For example, when the quantity of source devices that are performing projection onto the smart TV is 1, if the smart TV receives a projection instruction sent by a new source device, the smart TV may determine that the quantity of source devices that currently need to perform projection is increased by one. That is, the quantity N of source devices is 2. For another example, when the quantity of source devices that are performing projection onto the smart TV is 2, if the smart TV detects that a communications connection between one of the source devices and the smart TV is disconnected, the smart TV may determine that the quantity of source devices that currently need to perform projection is subtracted by one. That is, the quantity N of source devices is 1.

When the smart TV determines that the quantity N of source devices that need to perform projection changes, for example, the quantity N of source devices is increased or decreased, the smart TV may continue to perform steps S1502 to S1505, and negotiate a projection parameter used during this projection with each source device to perform projection display.

S1502: The smart TV determines, based on the quantity N of source devices, a reference threshold of a projection parameter used by each source device during projection.

After detecting the current quantity N of source devices, the smart TV may dynamically negotiate, based on the current quantity N of source devices, a projection parameter used during this projection with the source device. The projection parameter is, for example, a projection resolution, a transmission bit rate, or an encoding compression rate.

In this embodiment of this application, the smart TV may first set the corresponding reference threshold for the projection parameter of each source device based on the quantity N of source devices. Further, the source device determines, based on the reference threshold delivered by the smart TV, a final used projection parameter.

In step S1502, when the quantity N of source devices is larger, when the smart TV sets the reference threshold of the projection parameter for each source device, display smoothness of the destination device during projection may be preferentially ensured. When the quantity N of source devices is smaller, when the smart TV sets the reference threshold of the projection parameter for each source device, display definition of the destination device during projection may be preferentially ensured.

For example, the reference threshold of the projection parameter may include a reference threshold of the projection resolution. The reference threshold of the projection resolution is a maximum projection resolution supported by the smart TV during projection. For example, when the quantity N of source devices is 1, the smart TV may set, to 1080p, a reference threshold of a projection resolution used when the source device performs projection. When the quantity N of source devices is 2, the smart TV may set, to 720p, a reference threshold of a projection resolution used when each source device performs projection. In other words, when only one source device performs projection onto the smart TV, a maximum resolution supported by the smart TV for the source device is 1080p. When two source devices perform projection onto the smart TV, a maximum resolution supported by the smart TV for each source device is 720p.

In this way, when there are a relatively large quantity of projection source devices, a projection resolution may be decreased, to improve display smoothness of the destination device during projection. Correspondingly, when there are a relatively small quantity of projection source devices, a projection resolution may be increased, to improve display definition of the destination device during projection.

For another example, the reference threshold of the projection parameter may include a reference threshold of the transmission bit rate. The reference threshold of the transmission bit rate is a maximum transmission bit rate supported by the smart TV during projection. For example, when the quantity N of source devices is 1, the smart TV may set, to 5 M, a reference threshold of a transmission bit rate used when the source device performs projection. When the quantity N of source devices is 2, the smart TV may set, to 3 M, a reference threshold of a transmission bit rate used when each source device performs projection. In other words, when only one source device performs projection onto the smart TV, a maximum transmission bit rate supported by the smart TV for the source device is 5 M. When two source devices perform projection onto the smart TV, a maximum transmission bit rate supported by the smart TV for each source device is 3 M.

In this way, when there are a relatively large quantity of projection source devices, a transmission bit rate may be decreased, to improve display smoothness of the destination device during projection. Correspondingly, when there are a relatively small quantity of projection source devices, a transmission bit rate may be increased, to improve display definition of the destination device during projection.

For another example, the reference threshold of the projection parameter may include a reference threshold of the encoding compression rate. The reference threshold of the encoding compression rate is a maximum encoding compression rate supported by the smart TV during projection. For example, a quantity of P frames between adjacent I frames may be used to indicate the encoding compression rate. When the quantity N of source devices is 1, the smart TV may set a maximum of five P frames between adjacent I frames transmitted by the source device during projection. When the quantity N of source devices is 2, the smart TV may set a maximum of 10 P frames between adjacent I frames transmitted by each source device during projection.

In this way, when there are a relatively large quantity of projection source devices, an encoding compression rate may be increased, to improve display smoothness of the destination device during projection. Correspondingly, when there are a relatively small quantity of projection source devices, an encoding compression rate may be decreased, to improve display definition of the destination device during projection.

It should be noted that the encoding compression rate and the transmission bit rate meet a specific functional relationship. The source device may determine a reference threshold of one of the encoding compression rate and the transmission bit rate. Further, the source device may determine a reference threshold of the other parameter based on the preset functional relationship.

For example, correspondences between different quantities N of source devices and reference thresholds of different projection parameters may be preset on the smart TV. Further, after obtaining the current quantity N of source devices, the smart TV may separately determine the reference threshold of the projection resolution, the transmission bit rate, or the encoding compression rate based on the correspondences.

Alternatively, each time after obtaining the current quantity N of source devices, the smart TV may calculate the reference threshold of the corresponding projection resolution, transmission bit rate, or encoding compression rate based on the quantity N of source devices. For example, when a resolution of the smart TV is 2K (that is, 2560p), if the quantity N of source devices is 1, the smart TV may set 2560p as the reference threshold of the projection resolution. If the quantity N of source devices is 2, the smart TV may set 1280p (that is, 2560p/2) as the reference threshold of the projection resolution. For another example, when a transmission bandwidth of the smart TV is 10 M, if the quantity N of source devices is 1, the smart TV may set 10 M as the reference threshold of the transmission bit rate. If the quantity N of source devices is 2, the smart TV may set 5 M (that is, 10 M/2) as the reference threshold of the transmission bit rate.

S1503: The smart TV broadcasts the reference threshold to the N source devices.

In step S1503, after determining the reference threshold of the projection parameter based on the quantity N of source devices, the smart TV may broadcast the determined reference threshold to each member in the device group, so that all the N source devices of the smart TV in the device group can obtain the reference threshold of the projection parameter determined by the smart TV.

In some other embodiments, the smart TV may further use a broadcast to carry the current quantity N of source devices. Subsequently, the source device may also determine, based on the quantity N of source devices, the projection parameter used during this projection.

It may be understood that the smart TV may broadcast a codec protocol supported by the smart TV to the source device.

S1504: Each of the N source devices determines, based on the reference threshold, a projection parameter used during this projection.

For example, a mobile phone A is one of the N source devices of the smart device. After receiving the reference threshold of the projection parameter sent by the smart device, the mobile phone A may determine, with reference to a projection capability of the mobile phone A, a specific projection parameter used during this projection.

For example, a reference threshold of a projection resolution sent by the smart TV is 720p. The mobile phone A may obtain a maximum resolution supported by the mobile phone A. If the maximum resolution supported by the mobile phone A is greater than 720p, the mobile phone A may determine 720p as a projection resolution used during projection. If the maximum resolution supported by the mobile phone A is less than 720p, the mobile phone A may determine the maximum resolution supported by the mobile phone A as a projection resolution used during projection.

For another example, a reference threshold of a transmission bit rate sent by the smart TV is 5 M. The mobile phone A may obtain a maximum transmission bit rate supported by the mobile phone A. If the maximum transmission bit rate supported by the mobile phone A is greater than 5 M, the mobile phone A may determine 5 M as a transmission bit rate used during projection. If the maximum transmission bit rate supported by the mobile phone A is less than 5 M, the mobile phone A may determine the maximum transmission bit rate supported by the mobile phone A as a transmission bit rate used during projection.

Because the encoding compression rate and the transmission bit rate meet a specific functional relationship, after determining the transmission bit rate used during projection, the mobile phone A may calculate, based on the preset functional relationship, the encoding compression rate used during this projection. It can be learned that, after receiving the reference threshold sent by the destination device, different source devices may determine, based on projection capabilities of the source devices, specific projection parameters used during this projection, and the projection parameters determined by the source devices may be the same or different.

In some other embodiments, if the broadcast received by the mobile phone A includes the current quantity N of source devices, the mobile phone A may further determine, according to the method in step S404 or S1004a in the foregoing embodiment, one or more of the projection parameters such as the projection resolution, the transmission bit rate, or the compression coding rate used during projection.

Alternatively, if the broadcast received by the mobile phone A includes both the reference threshold of the projection parameter and the current quantity N of source devices, the mobile phone A may further determine, based on the reference threshold of the projection parameter, one part of the projection parameters used during projection, and the mobile phone may further determine, based on the current quantity N of source devices, the other part of the projection parameters used during projection. For example, the mobile phone A may determine, based on the reference threshold of the projection resolution, the projection resolution used during projection. In addition, the mobile phone A may further determine, based on the current quantity N of source devices, the transmission bit rate and the encoding compression rate used during projection. This is not limited in this embodiment of this application.

Similar to the mobile phone A, each of the N source devices of the smart TV may determine, according to the foregoing method, a projection parameter used during this projection. In addition, the projection parameter determined by each source device may dynamically change based on the current quantity N of source devices. When there are a relatively large quantity of source devices for projection, display smoothness during projection is preferentially ensured. When there are a relatively small quantity of source devices for projection, display definition during projection is preferentially ensured. Subsequently, each source device may perform projection onto the smart TV for display based on the determined projection parameter.

Each source device may determine, based on the codec protocol supported by the smart TV, a codec protocol supported by the source device.

S1505: Each of the N source devices sends the determined projection parameter to the smart TV for storage.

Similar to steps S405, S1005a, and S1005b, in step S1505, after determining, by using step S1504, the projection parameter used during projection, each source device may send the projection parameter to the smart TV for storage, so that the smart TV subsequently decodes and displays, based on the projection parameter of each source device, display data sent by each source device.

It may be understood that, in steps S405, S1005a, S1005b, and S1505, after storing a newly received projection parameter, the smart TV may delete a previous projection parameter. For example, when the quantity of source devices that need to perform projection onto the smart TV is updated from 1 to 2, the smart TV stores a projection parameter received when there are two source devices, and deletes a projection parameter received when there is one source device.

S1506: Each of the N source devices sends, to the smart TV based on the projection parameter, display data that is being displayed on each source device.

S1507: The smart TV simultaneously displays, based on the projection parameter, the display data sent by the N source devices.

In steps S1506 and S1507, each source device of the smart TV may encode, based on the determined projection parameter of each source device, the display data that is being displayed, and send the encoded display data to the smart TV. Correspondingly, after receiving the display data sent by each source device, the smart TV may decode and display the display data based on the projection parameter corresponding to the source device.

Finally, the smart TV may simultaneously display the display data sent by the N source devices, so that display interfaces of the plurality of source devices are simultaneously presented on the smart TV and are displayed for a user. In addition, when the quantity of source devices changes, the smart TV (namely, the destination device) may renegotiate projection parameters used during this projection with the source devices. When there are a relatively large quantity of source devices, display smoothness during projection can be preferentially ensured by adjusting a projection parameter. When there are a relatively small quantity of source devices, display definition during projection can be preferentially ensured by adjusting a projection parameter, so that the user can obtain better use experience in different projection scenarios.

The embodiments of this application disclose an electronic device. The electronic device may be the source device, or may be the destination device. Specifically, the electronic device may include a processor, and a memory, an input device, and an output device that are connected to the processor. The input device and the output device may be integrated into one device. For example, a touch sensor may be used as an input device, a display may be used as an output device, and the touch sensor and the display may be integrated into a touchscreen.

Figure 16:
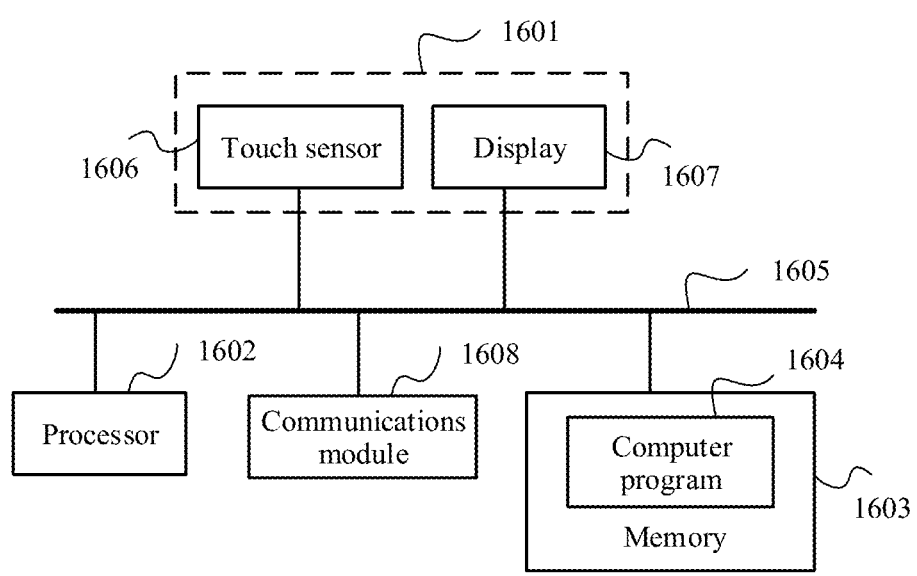
FIG. 16 is a schematic diagram of a structure of an electronic device according to an embodiment of this application.

In this case, as shown in FIG. 16, the electronic device may include a touchscreen 1601, one or more processors 1602, a memory 1603, a communications module 1608, one or more applications (not shown), and one or more computer programs 1604. The touchscreen 1601 includes a touch sensor 1606 and a display 1607. The foregoing components may be connected through one or more communications buses 1605. The one or more computer programs 1604 are stored in the memory 1603 and are configured to be executed by the one or more processors 1602. The one or more computer programs 1604 include instructions, and the instructions may be used to perform the steps in the corresponding embodiments. All related content of the steps in the foregoing method embodiments may be cited in function descriptions of corresponding physical devices. Details are not described herein again. It may be understood that the electronic device may also include a display. The touch sensor and the display do not integrate into a touchscreen. Input may be performed in another input manner, for example, a keyboard, a mouse, a remote control, or a touch sensor that is not integrated with the display.

For example, the processor 1602 may be specifically the processor 110 shown in FIG. 3, the memory 1603 may be specifically the internal memory 116 and/or the external memory shown in FIG. 3, and the display 1607 may be specifically the display 194 shown in FIG. 3, and the touch sensor 1606 may be specifically the touch sensor in the sensor module 180 shown in FIG. 3. This is not limited in the embodiments of this application.

The foregoing descriptions about implementations allow a person skilled in the art to understand that, for the purpose of convenient and brief description, division into the foregoing function modules is used as an example for illustration. In actual application, the foregoing functions can be allocated to different function modules and implemented according to a requirement. That is, an inner structure of an apparatus is divided into different function modules to implement all or some of the functions described above. For detailed working processes of the foregoing system, apparatus, and unit, refer to corresponding processes in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of the embodiments in this application, but are not intended to limit the protection scope of the embodiments in this application. Any variation or replacement within the technical scope disclosed in the embodiments in this application shall fall within the protection scope of the embodiments in this application. Therefore, the protection scope of the embodiments of this application shall be subject to the protection scope of the claims.

What is claimed is:

1. A projection display method, comprising:
   sending, by a source device, a projection instruction to a destination device, wherein the projection instruction instructs the destination device to project a display interface of the source device onto a display of the destination device;
   receiving, by the source device, a first broadcast sent by the destination device, wherein the first broadcast comprises a quantity N of source devices that need to perform projection onto the destination device for display and a reference threshold of a first projection parameter for projection by each of the N source devices, wherein N is an integer greater than or equal to two, and wherein the reference threshold indicates a maximum value for the first projection parameter supported by the destination device;
   negotiating, by the source device, a value for the first projection parameter with the destination device based on the quantity N, the reference threshold, and a capability of the source device, wherein the first projection parameter comprises an encoding compression rate and a transmission bit rate; and
   sending, by the source device, first display data of the display interface to the destination device based on the negotiated value for the first projection parameter.

2. The method according to claim 1, wherein the source device stores a correspondence between different quantities of source devices and corresponding projection parameters; and
   wherein negotiating the value for the first projection parameter with the destination device comprises:
      determining, by the source device based on the correspondence, the first projection parameter corresponding to the quantity N; and
      sending, by the source device, the first projection parameter to the destination device for storage.

3. The method according to claim 1, wherein before negotiating the value for the first projection parameter with the destination device, the method further comprises:
   receiving, by the source device, a codec protocol type supported by the destination device sent by the destination device; and
   determining, by the source device based on the codec protocol type supported by the destination device, a codec protocol type used during projection.

4. The method according to claim 1, wherein after the sending the first display data of the display interface to the destination device, the method further comprises:
   receiving, by the source device, a second broadcast sent by the destination device, wherein the second broadcast comprises a quantity M of source devices that need to perform projection onto the display of the destination device, wherein M is a positive integer not equal to N;
   negotiating, by the source device, a second projection parameter with the destination device based on the quantity M, wherein the second projection parameter is different from the first projection parameter; and
   sending, by the source device, second display data of the display interface to the destination device based on the second projection parameter.

5. A projection display method, comprising:
- determining, by a destination device, that a quantity of source devices that need to perform projection onto a display of the destination device is N, wherein N is an integer greater than or equal to two;
- determining, by the destination device based on the quantity N of source devices, a reference threshold of a first projection parameter used by each source device during projection, wherein the reference threshold indicates a maximum value for the first projection parameter supported by the destination device;
- sending, by the destination device, a first broadcast to each of the N source devices, wherein the first broadcast comprises the reference threshold of the first projection parameter;
- negotiating, by the destination device based on the quantity N, the reference threshold, and a capability of a respective source device of the N source devices, a value for the first projection parameter used during projection with each of N source devices, wherein the first projection parameter for a particular source device comprises an encoding compression rate and a transmission bit rate; and
- receiving, by the destination device, display data sent by each of the N source devices based on the negotiated value for the first projection parameters for each of the N source devices, and simultaneously displaying the display data sent by the N source devices in a projection interface.

6. The method according to claim 5, wherein negotiating the value for the first projection parameter used during projection with each of N source devices comprises:
- sending, by the destination device, the first broadcast to each of the N source devices, wherein the first broadcast comprises the quantity N, so that each source device determines a corresponding first projection parameter based on the quantity N; and
- receiving and storing, by the destination device, the first projection parameter sent by each of the N source devices.

7. The method according to claim 5, wherein negotiating the value for the first projection parameter used during projection with each of N source devices comprises:
- receiving and storing, by the destination device, the first projection parameter sent by each of the N source devices.

8. The method according to claim 5, wherein after simultaneously displaying the display data sent by the N source devices in the projection interface, the method further comprises:
- determining, by the destination device, that the quantity of source devices that need to perform projection onto the display of the destination device is M, wherein M is a positive integer not equal to N;
- negotiating, by the destination device based on the quantity M of source devices, a second projection parameter used during projection with each of the M source devices, wherein the second projection parameter is different from the first projection parameter; and
- receiving, by the destination device, display data sent by each of the M source devices based on the second projection parameter, and simultaneously displaying the display data sent by the M source devices in the projection interface.

9. The method according to claim 5, wherein determining that the quantity of source devices that need to perform projection onto the display of the destination device is N comprises:
- determining, by the destination device, the quantity N of source devices based on a quantity of projection instructions sent by the source devices; or
- determining, by the destination device, the quantity N of source devices based on a quantity of established communications connections.

10. The method according to claim 8, wherein the first projection parameter comprises a first projection resolution, and the second projection parameter comprises a second projection resolution; and
wherein:
- M is greater than N, and the first projection resolution is greater than the second projection resolution; or
- M is less than N, and the first projection resolution is less than the second projection resolution.

11. The method according to claim 8, wherein the first projection parameter comprises a first encoding compression rate, and the second projection parameter comprises a second encoding compression rate; and
wherein:
- M is greater than N, and the first encoding compression rate is less than the second encoding compression rate; or
- M is less than N, and the first encoding compression rate is greater than the second encoding compression rate.

12. The method according to claim 8, wherein the first projection parameter comprises a first transmission bit rate, and the second projection parameter comprises a second transmission bit rate; and
wherein:
- M is greater than N, and the first transmission bit rate is greater than the second transmission bit rate; or
- M is less than N, and the first transmission bit rate is less than the second transmission bit rate.

13. An electronic device, wherein the electronic device is a source device during projection, and the source device comprises:
- a display;
- a communications module;
- one or more processors;
- one or more memories; and
- one or more computer programs, wherein the one or more computer programs are stored in the one or more memories, the one or more computer programs comprise instructions, and based on the instructions being executed by the source device, the source device is configured to:
- send a projection instruction to a destination device, wherein the projection instruction instructs the destination device to project a display interface of the source device onto a display of the destination device;
- receive a first broadcast sent by the destination device, wherein the first broadcast comprises a quantity N of source devices that need to perform projection onto the display of the destination device and a reference threshold of a first projection parameter for projection by each of the N source devices, wherein N is an integer greater than or equal to two, and wherein the reference threshold indicates a maximum value for the first projection parameter supported by the destination device;

negotiate a value for the first projection parameter with the destination device based on the quantity N, the reference threshold, and a capability of the source device, wherein the first projection parameter comprises an encoding compression rate and a transmission bit rate; and send first display data to the destination device based on the negotiated value for the first projection parameter.

14. The electronic device according to claim 13, wherein the source device stores a correspondence between different quantities of source devices and corresponding projection parameters; and wherein negotiating the value for the first projection parameter with the destination device based on the quantity N of source devices comprises:

determining, based on the correspondence, the first projection parameter corresponding to the quantity N; and sending the first projection parameter to the destination device for storage.

15. The electronic device according to claim 14, wherein based on the instructions being executed by the source device, the source device is further configured to:

before negotiating the value for the first projection parameter with the destination device, receive a codec protocol type supported by the destination device sent by the destination device; and determine based on the codec protocol type supported by the destination device, a codec protocol type used during projection.

16. The electronic device according to claim 15, wherein based on the instructions being executed by the source device, the source device is further configured to:

after sending the first display data to the destination device, receive a second broadcast sent by the destination device, wherein the second broadcast comprises a quantity M of source devices that need to perform projection onto the display of the destination device, wherein M is a positive integer not equal to N;

negotiate a second projection parameter with the destination device based on the quantity M, wherein the second projection parameter is different from the first projection parameter; and send second display data to the destination device based on the second projection parameter.

17. An electronic device, wherein the electronic device is a destination device during projection, and the destination device comprises:

a display;
a communications module;
one or more processors;
one or more memories; and
one or more computer programs, wherein the one or more computer programs are stored in the one or more memories, the one or more computer programs comprise instructions, and based on the instructions being executed by the destination device, the destination device is configured to:

determine that a quantity of source devices that need to perform projection onto the destination device for display is N, wherein N is an integer greater than or equal to two;

determine, based on the quantity N of source devices, a reference threshold of a first projection parameter used by each source device during projection, wherein the reference threshold indicates a maximum value for the first projection parameter supported by the destination device;

send a first broadcast to each of the N source devices, wherein the first broadcast comprises the reference threshold of the first projection parameter;

negotiate, based on the quantity N, the reference threshold, and a capability of a respective source device of the N source devices, a value for the first projection parameter used during projection with each of N source devices, wherein the first projection parameter comprises an encoding compression rate and a transmission bit rate; and receive display data sent by each of the N source devices based on the negotiated values for the first projection parameters for each of the N source devices, and simultaneously display the display data sent by the N source devices in a projection interface.

18. The electronic device according to claim 17, wherein negotiating the value for the first projection parameter used during projection with each of the N source devices comprises:

sending the first broadcast to each of the N source devices, wherein the first broadcast comprises the quantity N, so that each source device determines a corresponding first projection parameter based on the quantity N; and receiving and storing the corresponding first projection parameters sent by each of the N source devices.

19. The electronic device according to claim 17, wherein negotiating the value for the first projection parameter used during projection with each of N source devices comprises:

receiving and storing the first projection parameter sent by each of the N source devices.

20. The electronic device according to claim 17, wherein the destination device is further configured to:

after simultaneously displaying the display data sent by the N source devices, determine that the quantity of source devices that need to perform projection onto the display of the destination device is M, wherein M is a positive integer not equal to N;

negotiate a second projection parameter used during projection with each of the M source devices based on the quantity M, wherein the second projection parameter is different from the first projection parameter; and receive display data sent by each of the M source devices based on the second projection parameter, and simultaneously display the display data sent by the M source devices in the projection interface.

* * * * *

UNITED STATES PATENT AND TRADEMARK OFFICE
CERTIFICATE OF CORRECTION

| | | |
|---|---|---|
| PATENT NO. | : 12,279,079 B2 | Page 1 of 1 |
| APPLICATION NO. | : 17/625048 | |
| DATED | : April 15, 2025 | |
| INVENTOR(S) | : Wang et al. | |

It is certified that error appears in the above-identified patent and that said Letters Patent is hereby corrected as shown below:

In the Claims

Claim 4: Column 30, Line 53: "The method according to claim 1, wherein after the" should read as -- The method according to claim 1, wherein after --.

Claim 5: Column 31, Line 4: "display of the destination device is N, wherein Nis an" should read as -- display of the destination device is N, wherein N is an --.

Signed and Sealed this
Thirtieth Day of September, 2025

John A. Squires
*Director of the United States Patent and Trademark Office*